United States Patent
Waldman et al.

(10) Patent No.: US 9,752,835 B2
(45) Date of Patent: Sep. 5, 2017

(54) UNITARY HEAT EXCHANGERS HAVING INTEGRALLY-FORMED COMPLIANT HEAT EXCHANGER TUBES AND HEAT EXCHANGE SYSTEMS INCLUDING THE SAME

(71) Applicant: HONEYWELL INTERNATIONAL INC., Morristown, NJ (US)

(72) Inventors: David Waldman, Chandler, AZ (US); Mark C. Morris, Phoenix, AZ (US); Donald G. Godfrey, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 233 days.

(21) Appl. No.: 13/911,904

(22) Filed: Jun. 6, 2013

(65) Prior Publication Data
US 2014/0360698 A1    Dec. 11, 2014

(51) Int. Cl.
*F28F 1/08*    (2006.01)
*F28F 1/10*    (2006.01)
(Continued)

(52) U.S. Cl.
CPC .............. *F28F 1/10* (2013.01); *B22F 3/1055* (2013.01); *F16L 27/11* (2013.01);
(Continued)

(58) Field of Classification Search
CPC .............................. F28F 2265/26; F16L 27/11
(Continued)

(56) References Cited

U.S. PATENT DOCUMENTS 1,882,085 A * 10/1932 Nelson ............................ 165/81
2,241,209 A *  5/1941 Lea ................................ 165/159
(Continued)

FOREIGN PATENT DOCUMENTS

CH    476273 A    7/1969
CH    535415 A    3/1973
(Continued)

OTHER PUBLICATIONS

EP Search Report, EP 13157087.1-1605/2636982 dated Mar. 31, 2015.
(Continued)

*Primary Examiner* — Allen Flanigan
(74) *Attorney, Agent, or Firm* — Lorenz & Kopf, LLP

(57) ABSTRACT

Unitary heat exchangers having integrally-formed compliant heat exchanger tubes and heat exchange systems including the same are provided. The unitary heat exchanger comprises an inlet plenum and an outlet plenum and a plurality of integrally-formed compliant heat exchanger tubes. The plurality of integrally-formed compliant heat exchanger tubes extend between and are integral with the inlet and outlet plenums to define a heat exchanger first flow passage. Each integrally-formed compliant heat exchanger tube comprises a tubular member and a plurality of integral heat transfer fins extend radially outwardly from at least one portion of the tubular member. The tubular member has a proximal tube end and a distal tube end and comprises a tubular wall having an outer wall surface and an inner wall surface.

12 Claims, 17 Drawing Sheets

(51) Int. Cl.

| | | |
|---|---|---|
| *F16L 27/11* | (2006.01) | |
| *B22F 3/105* | (2006.01) | |
| *F28D 1/053* | (2006.01) | |
| *F28F 5/00* | (2006.01) | |
| *F28D 7/00* | (2006.01) | |
| *F28F 1/00* | (2006.01) | |
| *F28D 7/16* | (2006.01) | |
| *F28F 1/26* | (2006.01) | |
| *F28D 21/00* | (2006.01) | |

(52) U.S. Cl.
CPC ....... *F28D 1/05316* (2013.01); *F28D 7/0058* (2013.01); *F28F 1/006* (2013.01); *F28F 1/08* (2013.01); *F28F 5/00* (2013.01); *F28D 7/16* (2013.01); *F28D 2021/0021* (2013.01); *F28F 1/26* (2013.01); *F28F 2255/02* (2013.01); *F28F 2255/18* (2013.01); *F28F 2265/26* (2013.01); *Y02P 10/295* (2015.11)

(58) Field of Classification Search
USPC ..................................... 165/81, 83; 285/226
See application file for complete search history.

(56) References Cited

U.S. PATENT DOCUMENTS

| | | | |
|---|---|---|---|
| 2,911,200 A | | 11/1959 | Gardner et al. |
| 3,185,210 A | | 5/1965 | Kuhne et al. |
| 3,364,548 A | * | 1/1968 | Marco .................. B21D 53/085 |
| | | | 165/166 |
| 3,409,075 A | * | 11/1968 | Long ............................. 165/154 |
| 3,527,291 A | * | 9/1970 | Neary et al. .................... 165/83 |
| 3,549,176 A | * | 12/1970 | Contreras ....................... 285/55 |
| 4,120,352 A | | 10/1978 | Husson |
| 4,350,372 A | * | 9/1982 | Logsdon ........................ 285/45 |
| 4,691,761 A | | 9/1987 | Kito et al. |
| 4,832,114 A | | 5/1989 | Yeh |
| 4,858,686 A | | 8/1989 | Calleson |
| 5,145,215 A | * | 9/1992 | Udell ............................. 285/49 |
| 5,407,237 A | * | 4/1995 | Smolowitz ..................... 285/31 |
| 5,918,667 A | | 7/1999 | Chiba et al. |
| 6,032,463 A | * | 3/2000 | Bock ............................. 60/323 |
| 6,263,570 B1 | * | 7/2001 | Cazacu .............. F28D 1/05383 |
| | | | 165/173 |
| 7,398,798 B2 | * | 7/2008 | Ostan et al. .................. 138/121 |
| 7,754,137 B2 | | 7/2010 | Sutcliffe et al. |
| 7,810,552 B2 | | 10/2010 | Slaughter |
| 7,866,372 B2 | | 1/2011 | Slaughter |
| 7,871,578 B2 | | 1/2011 | Schmidt |
| 8,306,665 B2 | | 11/2012 | Tsangaris et al. |
| 8,511,111 B2 | | 8/2013 | Lambert et al. |
| 2007/0251671 A1 | * | 11/2007 | Barnes et al. .................. 165/83 |
| 2009/0065185 A1 | | 3/2009 | Jekerle |
| 2009/0183857 A1 | | 7/2009 | Pierce et al. |
| 2009/0211743 A1 | | 8/2009 | Schrader et al. |
| 2010/0018673 A1 | | 1/2010 | Yang |
| 2010/0043415 A1 | | 2/2010 | Capelle |
| 2011/0056653 A1 | * | 3/2011 | Zacharias ....................... 165/83 |
| 2011/0088405 A1 | | 4/2011 | Turco |
| 2011/0115227 A1 | | 5/2011 | Shafer et al. |
| 2011/0168369 A1 | | 7/2011 | Kim |
| 2011/0272122 A1 | | 11/2011 | Corbeil et al. |
| 2012/0232857 A1 | | 9/2012 | Fisker et al. |
| 2012/0292000 A1 | | 11/2012 | Khan et al. |
| 2013/0167812 A1 | | 7/2013 | Kurihara |
| 2013/0186102 A1 | | 7/2013 | Lo |
| 2014/0110095 A1 | | 4/2014 | Chang |

FOREIGN PATENT DOCUMENTS

| | | |
|---|---|---|
| CH | 535415 | 5/1973 |
| DE | 102006003317 A1 | 8/2007 |
| DE | 102007027639 A1 | 12/2008 |
| DE | 102010038132 A1 | 4/2011 |
| EP | 0564135 A2 | 10/1993 |
| EP | 1978323 A3 | 10/2008 |
| EP | 2148074 A2 | 1/2010 |
| EP | 2420790 A2 | 2/2012 |
| EP | 2620618 A2 | 7/2013 |
| EP | 2642083 A2 | 9/2013 |
| FR | 2311269 A | 12/1976 |
| JP | 2002130060 A | 5/2002 |
| WO | 2006085792 A1 | 8/2006 |
| WO | 2012028747 A1 | 3/2012 |

OTHER PUBLICATIONS

Antoine D.: "3D Printer Spider-Bots" Nov. 18, 2011, retrieved from the Internet on Mar. 14, 2013, URL: http://www.growit3d.com/growit-blog/3d-printed-spider-bots/.

ProtoCAM's "Selective Laser Sintering (SLS), SLS Prototype" retrieved from the internet on Mar. 14, 2013, URL: http://www.protocam.com/html/sls.html.

Within's "Micro Cooler—Demonstrating an Effective Micro Cooling Control" retrieved from the Internet on Jun. 3, 2013, URL: http://withinlab.com/case-studies/index19.php.

Huan, Z et al.; Application of laser sintering technology in heat exchanger design and manufacture; Jun. 17, 2010; IEEE Xplore—Retrieved from the internet at: http://ieeexplore.ieee.org/xpl/freeabs_all.jsp?arnumber=5486244.

Liew L.S. et al.; The Application of the Brazing Process in Selective Laser Sintering Fabricated Parts—JSMEA; vol. 46 (2003), No. 3 Special Issue on Recent Advances in Materials and Processing pp. 506-511; Retrieved from the internet at: http://www.jstage.jst.go.jp/article/jsmea/46/3/46_506/_article.

Terutake, H. et al.; The application of blazing process in SLS process fabricated heat exchanger; Science Links Japan—Retrieved from the internet at: http://sciencelinks.jp/j-east/article/200324/000020032403A0818549.php.

Rapid prototyping shows its metal; Eureka—The Site for Engineering Design; Retrieved from the internet at: http://www.eurekamagazine.co.uk/article/27538/Rapid-prototyping-shows-its-metal.aspx.

Wong, M. et al; Convective heat transfer and pressure losses across novel heat sinks fabricated by selective laser melting; Retrieved from the internet at: http://www.sciencedirect.com/science/article/pii/S0017931008003311.

Direct Metal Laser Sintering—CRDM; Retrieved from the internet at: http://www.crdm.co.uk/direct-metal-laser-sintering-services.html.

Lepkowski, J. et al.; Zener diode based integrated filters, an alternative to traditional EMI filter devices.

Huan, Z et al; IEEE Explore—Application of Laser Sintering Technology in Heat Exchanger design and Manufacture; Issue date Apr. 16-18, 2010.

Wong, M et al; Convective Heat Transfer and Pressure Losses Across Novel Heat Sinks Fabricated by Selective Laser Melting; International Journal of Heat and Mass Transfer; vol. 52, Issues 1-2, Jan. 15, 2009, pp. 281-288.

CRDM LTD; Direct Metal Laser Sintering; 2011; Retrieved from internet [http://www.crdm.co.uk/direct-metal-laser-sintering-services.html].

Shelley T.; Rapid Prototyping Shows Its Metal; EUREKA The Site for Engineering Design; Sep. 2010; Retrieved from internet [http://www.eurekamagazine.co.uk/article/27538/Rapid-prototyping-shows-its-metal.aspx].

Liew, LS et al; The Application of the Brazing Process in Selective Laser Sintering Fabricated Parts; JSME International Journal Series A; vol. 46 (2003), No. 3 Special Issue on Recent Advances in Materials and Processing, pp. 506-511.

Terutake, H et al; The application of blazing process in SLS process fabricated heat exchanger; Science Links Japan; vol. 11; 2003.

USPTO Office Action, Notification Date Oct. 1, 2014; U.S. Appl. No. 13/412,761.

EP Extended Search Report for Application No. EP 14176161.9 dated Oct. 31, 2014.

(56) References Cited

OTHER PUBLICATIONS

EP Extended Search Report for Application No. EP 14186714.3 dated Nov. 21, 2014.
Sabharwall, P. et al.; Diffusion-Welded Microchannel Heat Exchanger for Industrial Processes; Journal of Thermal Science and Enginering Applications, Mar. 2013, vol. 5; Copyright 2013 by Siemens AG.
Huan Z, DJ De Beer, et al.; Application of Laser Sintering Technology in Heat Exchanger Design and Manufacture; 2010 2nd International Conference on Computer Engineering and Technology, vol. 5; Copyright 2010 IEEE.
USPTO Office Action for U.S. Appl. No. 13/412,761 dated Feb. 13, 2015.
EP Examination Report for Application No. EP13157087.1 dated May 26, 2015.
USPTO Office Action for U.S. Appl. No. 14/064,748 dated Oct. 3, 2016.
USPTO Office Action, Notification Date May 15, 2015; U.S. Appl. No. 13/412,761.
USPTO Office Action for U.S. Appl. No. 14/064,748 dated May 19, 2016.
USPTO Office Action for U.S. Appl. No. 14/064,748 dated Feb. 8, 2017.
EP Examination for Application No. 14176161.9 dated May 10, 2017.
U.S. Notice of Allowance for U.S. Appl. No. 14/064,748 dated May 26, 2017.

* cited by examiner

UNITARY HEAT EXCHANGERS HAVING INTEGRALLY-FORMED COMPLIANT HEAT EXCHANGER TUBES AND HEAT EXCHANGE SYSTEMS INCLUDING THE SAME

TECHNICAL FIELD

The present invention generally relates to heat exchange systems, and more particularly relates to unitary heat exchangers having integrally-formed compliant heat exchanger tubes and heat exchange systems including the same.

BACKGROUND

Heat exchange is important to ensure machinery and engines such as gas turbine engines remain within acceptable operational parameters as well as to achieve efficient thermodynamic operation. In the field of gas turbine technology, a great deal of effort has been directed toward improving thermodynamic efficiency by operating gas turbine engines at increasing temperatures. As such, numerous heat exchange systems have been developed for directing heat within an engine to components where such heat is beneficial to the operating performance of the engine, while other heat exchange systems have been developed for directing heat away from engine components that normally cannot tolerate such high temperatures.

In one example, a class of heat exchange systems known as recuperators have been developed to recover heat from the engine exhaust, which is otherwise wasted energy, and redirect the recovered engine exhaust heat to the combustion portion of the engine, to increase its overall efficiency. Specifically, the recuperator transfers some of the waste heat in the exhaust to the compressed air that enters the combustion portion of the engine, thus preheating it before entering the fuel combustor stage. As the compressed air has been pre-heated, less fuel is needed to heat the compressed air/fuel mixture up to the desired turbine inlet temperature. By recovering some of the energy usually lost as waste heat, the recuperator can make a gas turbine engine significantly more efficient.

In another example, cooling air may be provided to various turbine engine components using cooling air extracted from other parts of the engine. For example, in some gas turbine engines, cooling air is extracted from the discharge of the compressor, and is then directed to certain portions of the turbine. During some operating conditions, the air that is extracted from the engine for cooling may be at temperatures that require the air to be cooled before being directed to the particular component requiring cooling. To achieve the required cooling, cooling air may be directed through one or more heat exchangers within the engine.

Recuperators, cooling air heat exchangers, and other heat exchangers employed in gas turbine engines have been conventionally designed using either plate-fin architectures or tubular architectures. Plate-fin architectures, while relatively inexpensive to manufacture, do not result in favorable weight and performance characteristics. Tubular architectures, while relatively more efficient than plate-fin architectures, are often prohibitively expensive to manufacture. Furthermore, conventional plate-fin and tubular architectures are susceptible to thermo-mechanical fatigue (TMF), especially at braze connections, as they do not allow adequate thermal growth and stress compliance during transient and steady state operations, reducing their service life and/or necessitating costly repairs. For example, heat exchanger tubes in conventional heat exchangers with tubular architectures may be rigidly coupled to each other by fins or otherwise, thereby restricting relative motion and inducing detrimental stresses in the heat exchanger.

Hence, there is a need for unitary heat exchangers having integrally-formed compliant heat exchanger tubes, and heat exchange systems including the same. There is also a need for unitary heat exchangers having integrally-formed compliant heat exchanger tubes and heat exchange systems having improved efficiency, reduced manufacturing costs, and increased operating lifespan over conventional heat exchangers, with less fluidic loss for improved engine cycle performance, and less weight.

BRIEF SUMMARY

Unitary heat exchangers are provided. In accordance with one exemplary embodiment, the unitary heat exchanger comprises an inlet plenum and an outlet plenum and a plurality of integrally-formed compliant heat exchanger tubes. The plurality of integrally-formed compliant heat exchanger tubes extend between and are integral with the inlet and outlet plenums to define a heat exchanger first flow passage. Each integrally-formed compliant heat exchanger tube comprises a tubular member and a plurality of integral heat transfer fins extending radially outwardly from at least one portion of the tubular member. The tubular member has a proximal tube end and a distal tube end and comprises a tubular wall having an outer wall surface and an inner wall surface.

Integrally-formed compliant heat exchanger tubes are provided in accordance with yet another exemplary embodiment of the present invention. The integrally-formed compliant heat exchanger tube comprises a tubular member having a proximal tube end and a distal tube end and comprising a tubular wall having an outer wall surface and an inner wall surface. A plurality of integral heat transfer fins extend radially outwardly from at least one portion of the tubular member. An integral bellows portion is formed in a portion of the tubular wall.

Heat exchange systems are provided in accordance with yet another exemplary embodiment of the present invention. The heat exchange system comprises a unitary heat exchanger including a heat exchanger first flow passage and a heat exchanger second flow passage. The heat exchanger first flow passage is configured to receive a first fluid and the heat exchanger second flow passage is configured to receive a second fluid. The unitary heat exchanger is configured to transfer heat between the first and second fluids. The heat exchanger first flow passage comprises an inlet plenum and an outlet plenum and a plurality of integrally-formed compliant heat exchanger tubes extending between and integral with the inlet and outlet plenums. Each integrally-formed compliant heat exchanger tube comprises a tubular member having a proximal tube end and a distal tube end and comprising a tubular wall having an outer wall surface and an inner wall surface. A plurality of integral heat transfer fins extend radially outwardly from at least one portion of the tubular member. An integral bellows portion is formed in a portion of the tubular wall.

Furthermore, other desirable features and characteristics of the unitary heat exchanger having integrally-formed compliant heat exchanger tubes and the heat exchange systems including the same will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
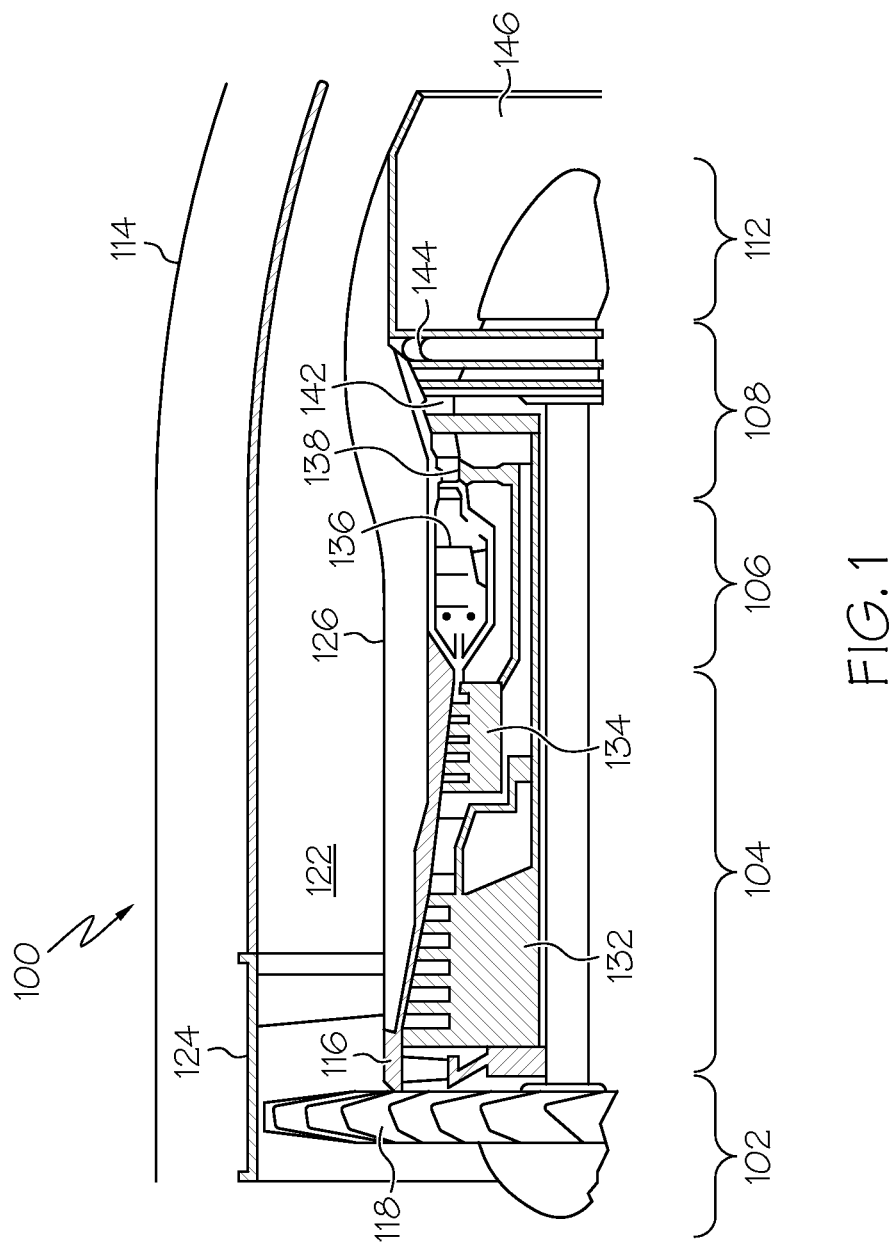
FIG. 1 is a simplified cross sectional view of a portion of an exemplary gas turbine engine.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to unitary heat exchangers having integrally-formed compliant heat exchanger tubes and heat exchange systems including the same. As used herein, the term "unitary" means one-piece such that the unitary heat exchanger having the plurality of integrally-formed compliant heat exchanger tubes is all one-piece and excludes brazing, fasteners, or the like for maintaining parts in a fixed relationship as a single unit. In the unitary heat exchanger, the integrally-formed compliant heat exchanger tubes are not removable or separable from inlet and outlet plenums as hereinafter described. Similarly, the terms "integrally-formed" and "integral" mean one-piece and excludes brazing, fasteners, or the like for maintaining portions thereon in a fixed relationship as a single unit. The terms "compliant" and "compliance" as used herein refer to the ability to absorb and attenuate relative motions to eliminate concentrated stress, thereby minimizing the negative effects of thermo-mechanical fatigue (TMF) during the heat exchange operation as hereinafter described. As hereinafter described, the integrally-formed "compliant" heat exchanger tubes are each independent and not rigidly coupled together, by fins or otherwise, thereby permitting their relative motion. This provision for relative movement between adjacent tubes reduces stresses that may occur in the structure if the movement were not permitted. An example of such stresses is thermal stresses due to the steady state and/or transient temperature gradients during heat exchange operation which result in TMF. The unitary heat exchangers having integrally-formed compliant heat exchanger tubes and the heat exchange systems including the same allow adequate thermal growth and stress compliance during transient and steady state operations and have improved efficiency, reduced manufacturing costs, and increased operating lifespan over conventional heat exchangers and heat exchange systems, with less fluidic loss for improved engine cycle performance, and less weight.

The unitary heat exchangers having integrally-formed compliant heat exchanger tubes and heat exchange systems including the same as described herein are suitable for use in gas turbine engines, and other applications. In one implementation, the heat exchange system is embodied as a recuperator for heating compressed air prior to the entry thereof into the combustor. In another implementation, the heat exchange system is embodied as a cooling air heat exchanger for reducing the temperature of cooling air prior to its delivery to turbine components that require cooling. However, it will be appreciated that the presently disclosed unitary heat exchangers having integrally-formed compliant heat exchanger tubes and the heat exchange systems including the same are not limited to use in the aforementioned embodiments. Rather, it is expected that the unitary heat exchangers having integrally-formed compliant heat exchanger tubes and the heat exchange systems including the same disclosed herein will be suitable for use in a wide array of applications. Some non-limiting examples include engine oil cooling, auxiliary power units, environmental control systems, chemical reaction systems, and any other systems where heat exchange between two fluid media is either required or desirable.

Referring now to FIGS. 1 through 5, the heat exchange system may be implemented as a cooling air heat exchanger. FIG. 1 depicts a simplified cross section view of an exemplary gas turbine engine 100. The depicted engine 100 includes an intake section 102, a compressor section 104, a combustion section 106, a turbine section 108, and an exhaust section 112. The intake section 102, compressor section 104, combustion section 106, turbine section 108, and exhaust section 112 are all mounted within a nacelle 114. The compressor section 104, combustion section 106, and turbine section 108 are all mounted within an engine case 116.

The intake section 102 includes a fan 118, which draws air into the engine 100 and accelerates it. A fraction of the accelerated fan air that is exhausted from the fan 118 is directed through a fan air bypass duct 122 that is defined by an outer fan duct 124 that is spaced apart from and surrounds an inner fan duct 126. Most of the fan air that flows through the fan air bypass duct 122 is discharged from the bypass duct 122 to generate a forward thrust. The fraction of fan air that does not flow into the fan air bypass duct 122 is directed into the compressor section 104.

The compressor section 104 can include one or more compressors. The engine 100 depicted in FIG. 1 includes two compressors: an intermediate pressure compressor 132 and a high pressure compressor 134. No matter the number of compressors it includes, the air that is directed into the compressor section 104 is pressurized to a relatively high pressure. The relatively high pressure air that is discharged from the compressor section 104 is directed into the combustion section 106. The combustion section 106 includes a combustor 136 that is coupled to receive both the relatively high pressure air and atomized fuel. The relatively high pressure air and atomized fuel are mixed within the combustor 136 and the mixture is ignited to generate combusted air. The combusted air is then directed into the turbine section 108.

The depicted turbine section 108 includes three turbines: a high pressure turbine 138, an intermediate pressure turbine 142, and a low pressure turbine 144, though it should be appreciated that any number of turbines may be included. The combusted air directed into the turbine section 108 expands through each of turbines 138, 142, 144, causing each to rotate. The air is then exhausted through a propulsion nozzle 146 disposed in the exhaust section 112 to provide additional forward thrust. As the turbines 138, 142, 144 rotate, each drives equipment in the gas turbine engine 100 via concentrically disposed shafts or spools as best seen in FIG. 1.

During operation, the temperatures within various portions of the engine 100 may reach relatively high temperatures. Thus, as depicted more clearly in FIG. 2, the engine 100 additionally includes a cooling air system 200 to provide cooling air to these various portions within the engine 100. The cooling air system 200 extracts relatively hot air 202 from within the engine case 116, directs the relatively hot air 202 through a cooling air unitary heat exchanger 204 to be cooled, and then directs the cooled air 206 back into the engine case 116 to provide cooling air to various portions of the engine 100. In the general embodiment depicted in FIG. 2, a portion of the fan air 203 in the fan air bypass duct 122 is supplied, via an inlet 214, to the unitary heat exchanger 204. The supplied fan air 203 flows through the unitary heat exchanger 204 to cool the relatively hot air 202 that is extracted from the engine case 116, and is then directed back into the fan air bypass duct 122. Thus, the unitary heat exchanger 204 is configured to transfer heat between the relatively hot air 202 (an exemplary "first fluid") and the fan air (an exemplary "second fluid"). In a preferred implementation, fan air may be selectively (as opposed to continuously) supplied to the heat exchanger to improve operating performance of the engine, as described in greater detail in commonly-assigned U.S. patent application Ser. No. 13/358,161, titled "GAS TURBINE ENGINE IN-BOARD COOLED COOLING AIR SYSTEM," filed Jan. 25, 2012, the contents of which are herein incorporated by reference in their entirety.

Figure 2:
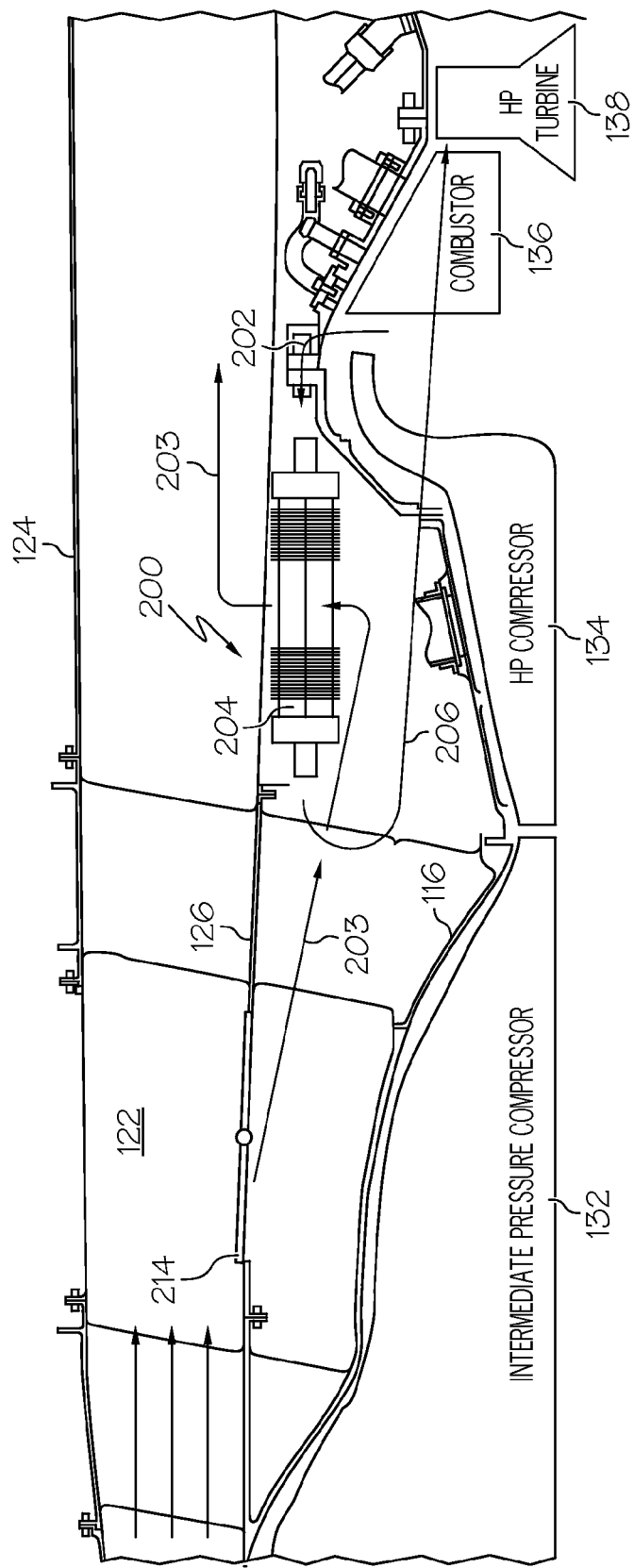
FIG. 2 is a close-up cross sectional view of a portion of the gas turbine engine of FIG. 1, including a cooling air system.

For clarity and ease of illustration, only a single unitary heat exchanger 204 and inlet 214 are depicted in simplified form in FIG. 2. However, as depicted more clearly in FIG. 3, the gas turbine engine 100 preferably includes a plurality of unitary heat exchangers 204 (204-1, 204-2, 204-3, ..., 204-8) and a plurality of inlets 214 (214-1, 214-2, 214-3, ..., 214-8) (not all of which are visible in FIG. 3). Each of the inlets 214 is associated with a different one of the unitary heat exchangers 204. Although the depicted cooling air system is implemented with eight unitary heat exchangers 204 and eight inlets 214, it will be appreciated that this is merely exemplary, and that other numbers of unitary heat exchangers 204 and inlets 214 may be used.

Figure 3:
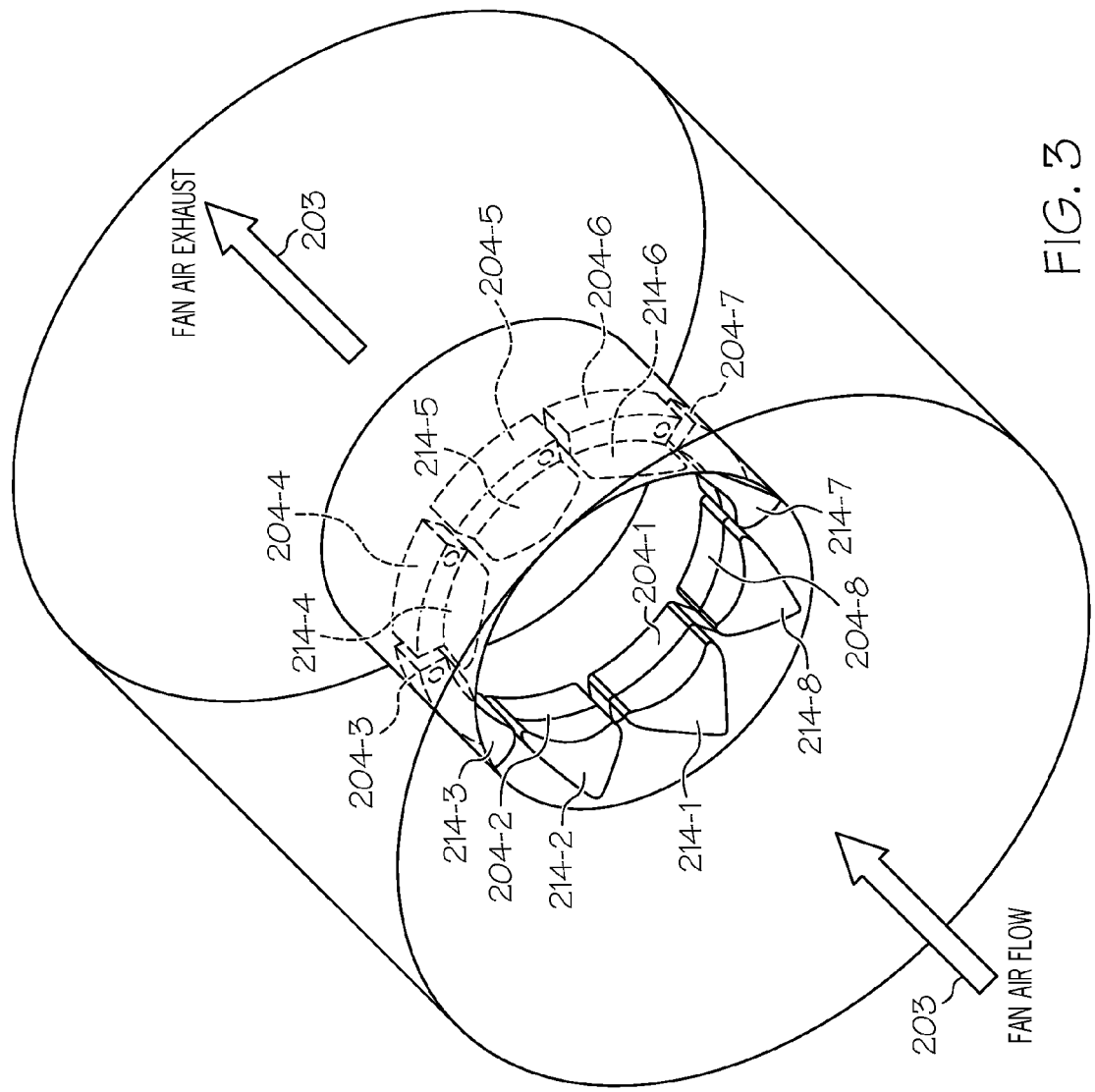
FIG. 3 is a simplified isometric view of inner and outer engine fan ducts, illustrating an arrangement of portions of the cooling air system of FIG. 2.
Figure 4A:
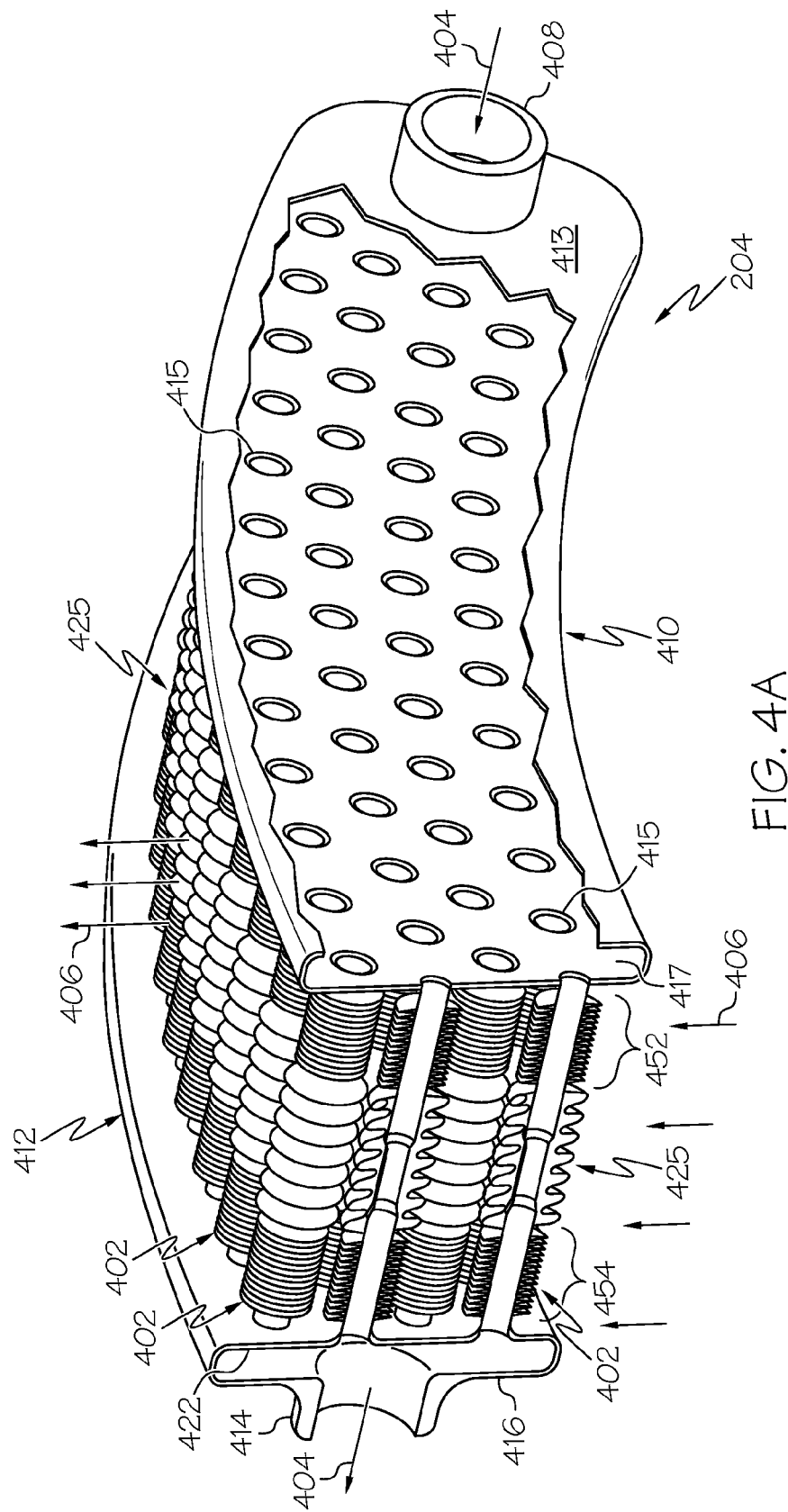
FIG. 4A is an isometric view of a portion of a unitary heat exchanger used to implement the cooling air system depicted in FIG. 2, according to exemplary embodiments of the present invention.
Figure 4B:
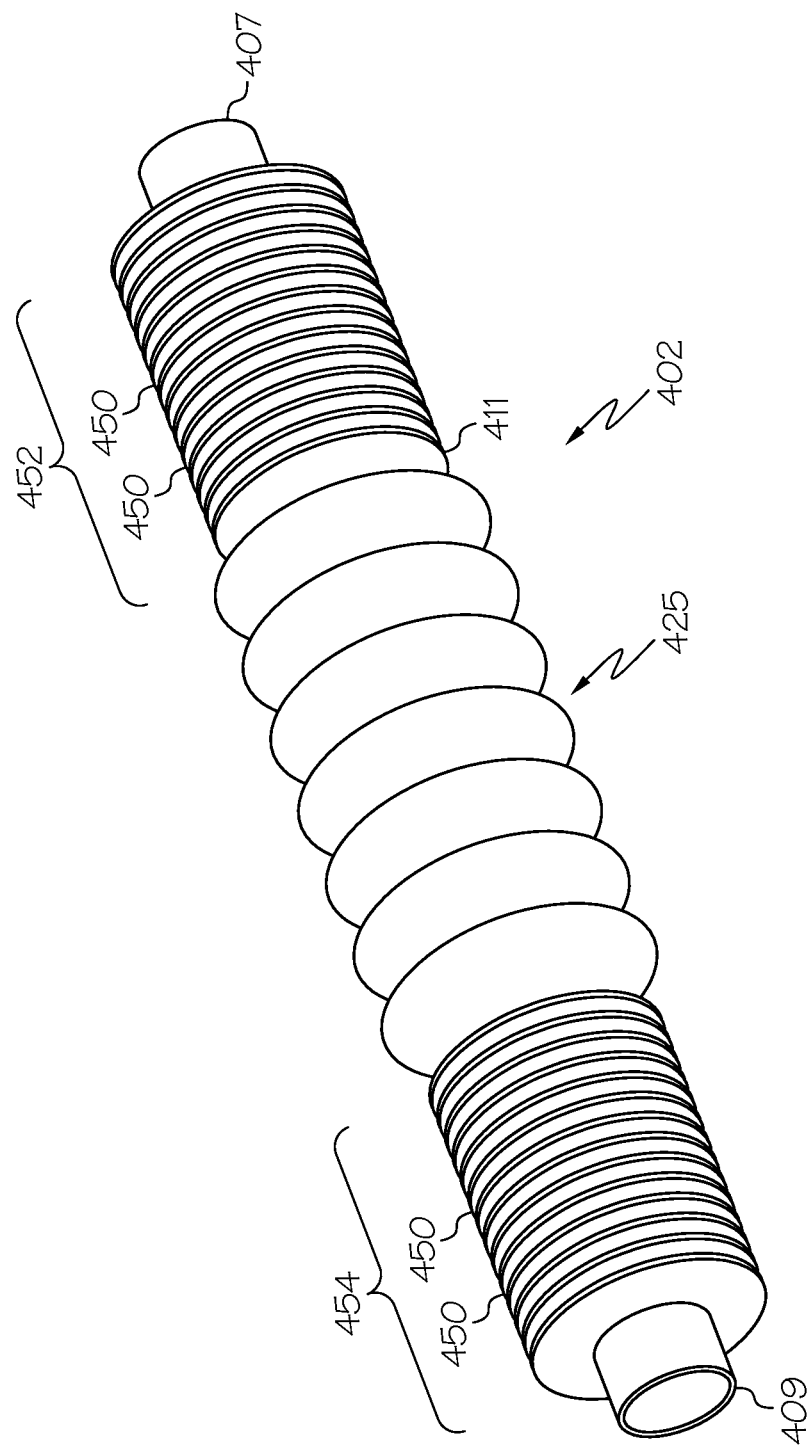
FIG. 4B is an isometric view (in isolation) of an exemplary integrally-formed compliant heat exchanger tube of the unitary heat exchanger of FIG. 4A.
Figure 4C:
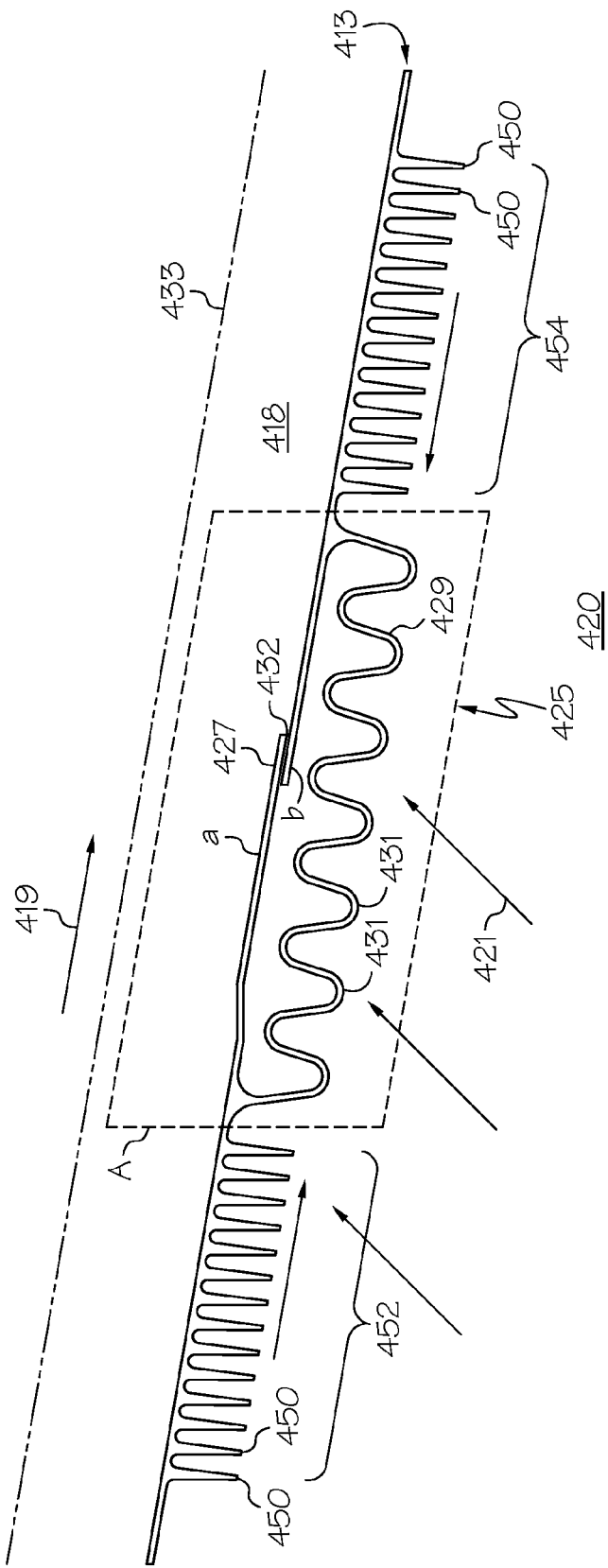
FIG. 4C is a simplified and enlarged cross-sectional view of a portion of the exemplary integrally-formed compliant heat exchanger tube of FIG. 4B, illustrating an integral bellows portion thereof comprising an internal slip joint and bellows.
Figure 4D:
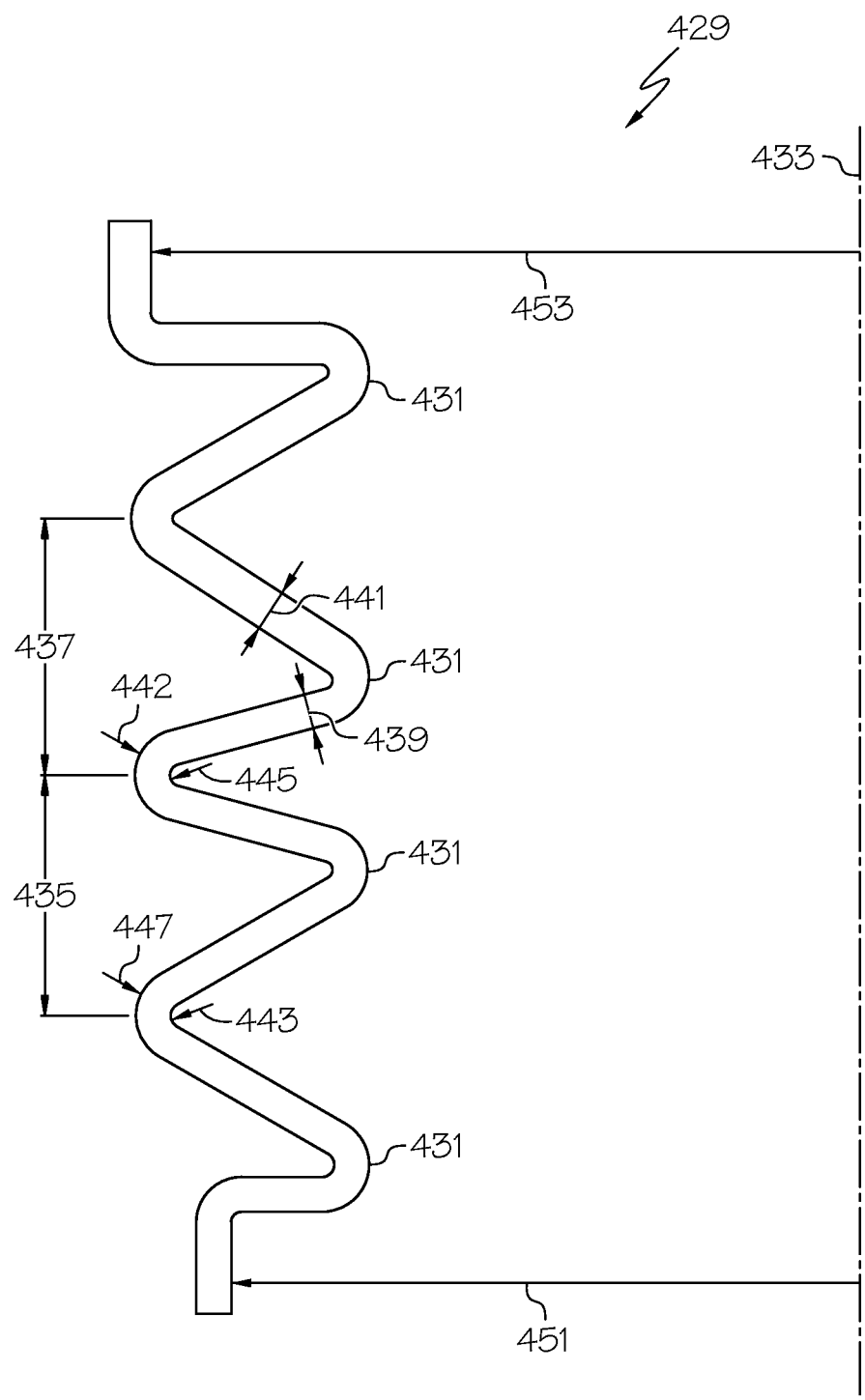
FIG. 4D is a perspective view of the exemplary bellows of the integral bellows portion of FIG. 4C.
Figure 5:
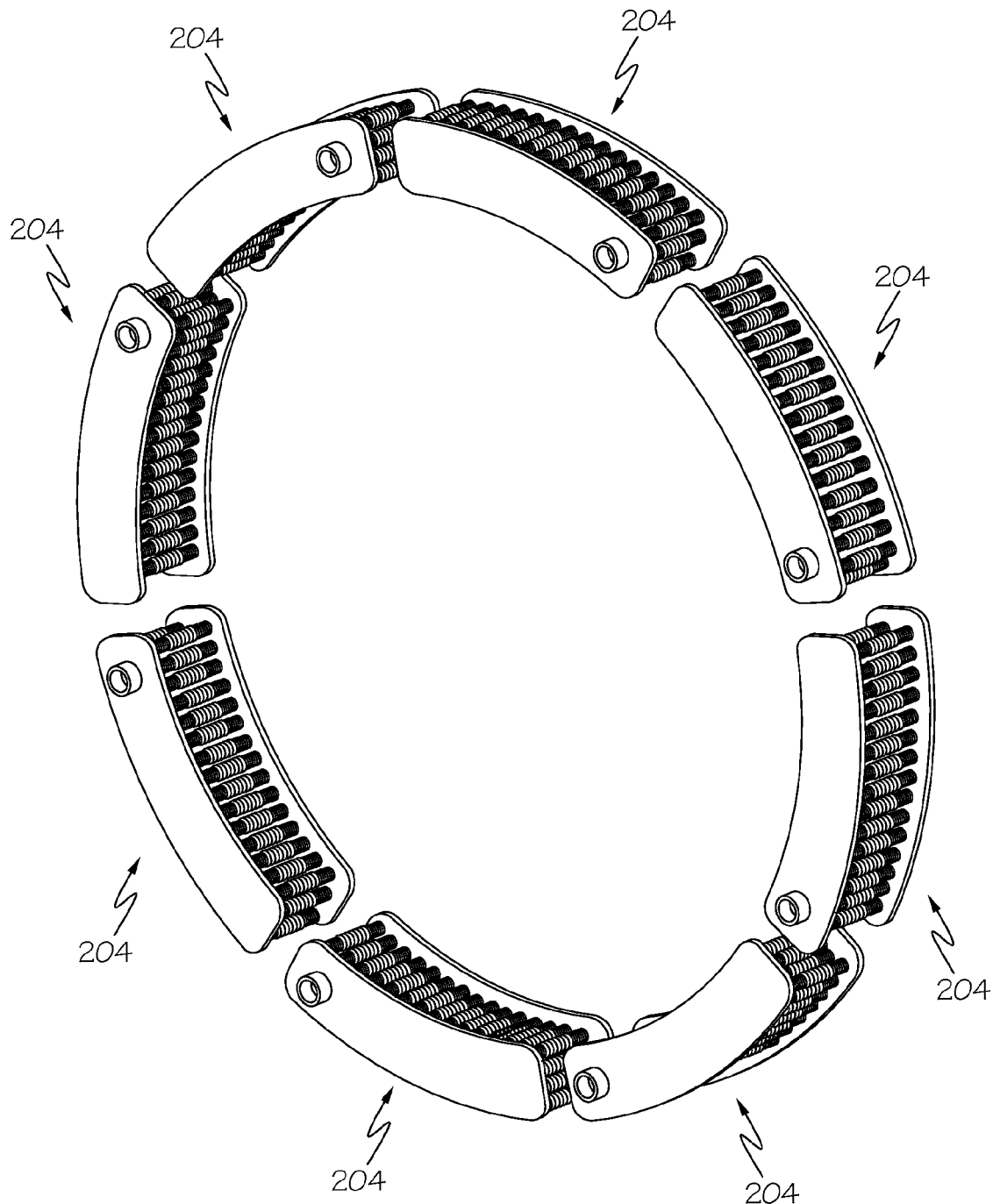
FIG. 5 depicts the unitary heat exchanger of FIG. 4A configured to be coupled to other unitary heat exchangers to form an annular ring.
Figure 6A:
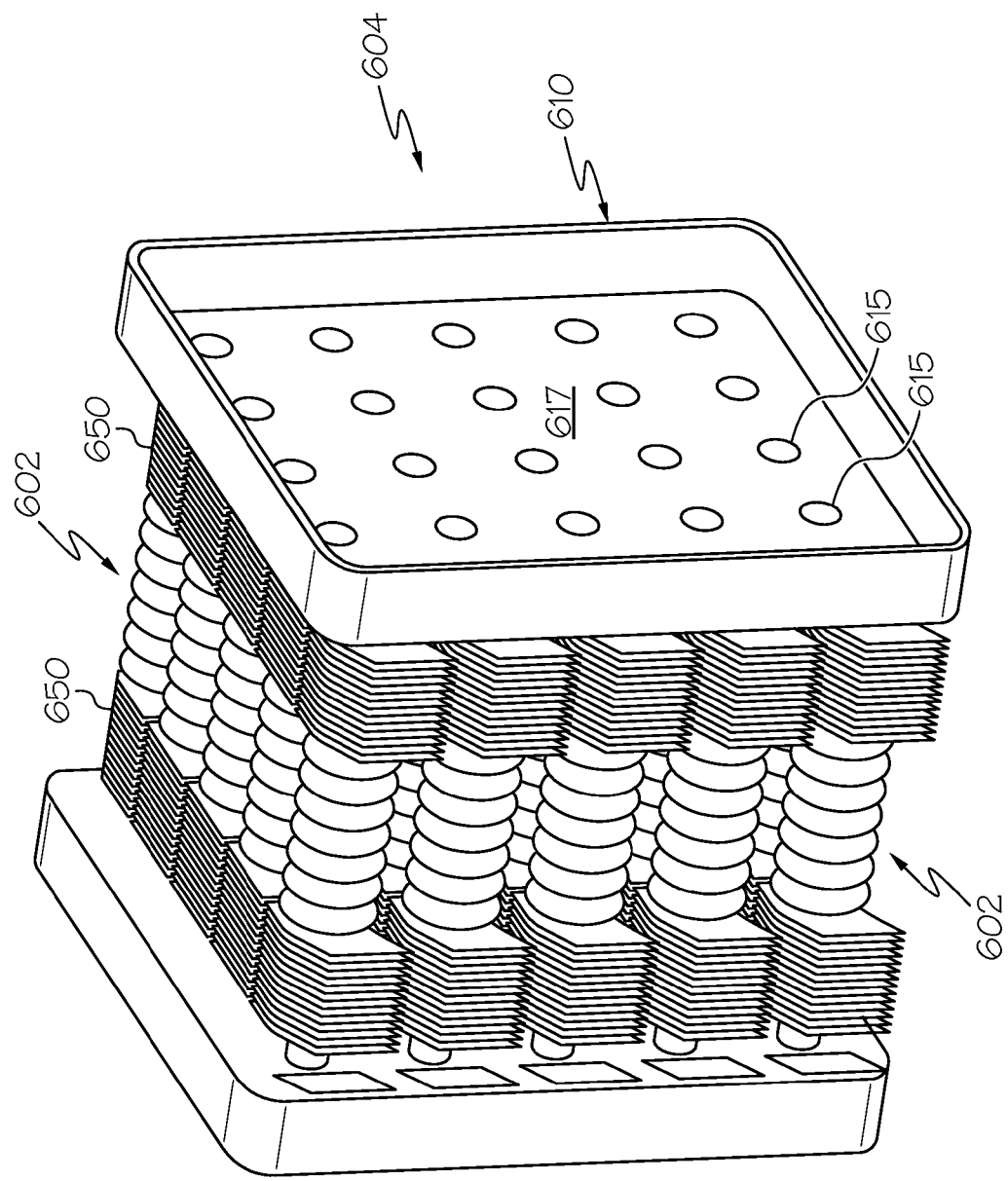
FIGS. 6A and 6B are isometric views of another unitary heat exchanger, according to yet another exemplary embodiment of the present invention.
Figure 6B:
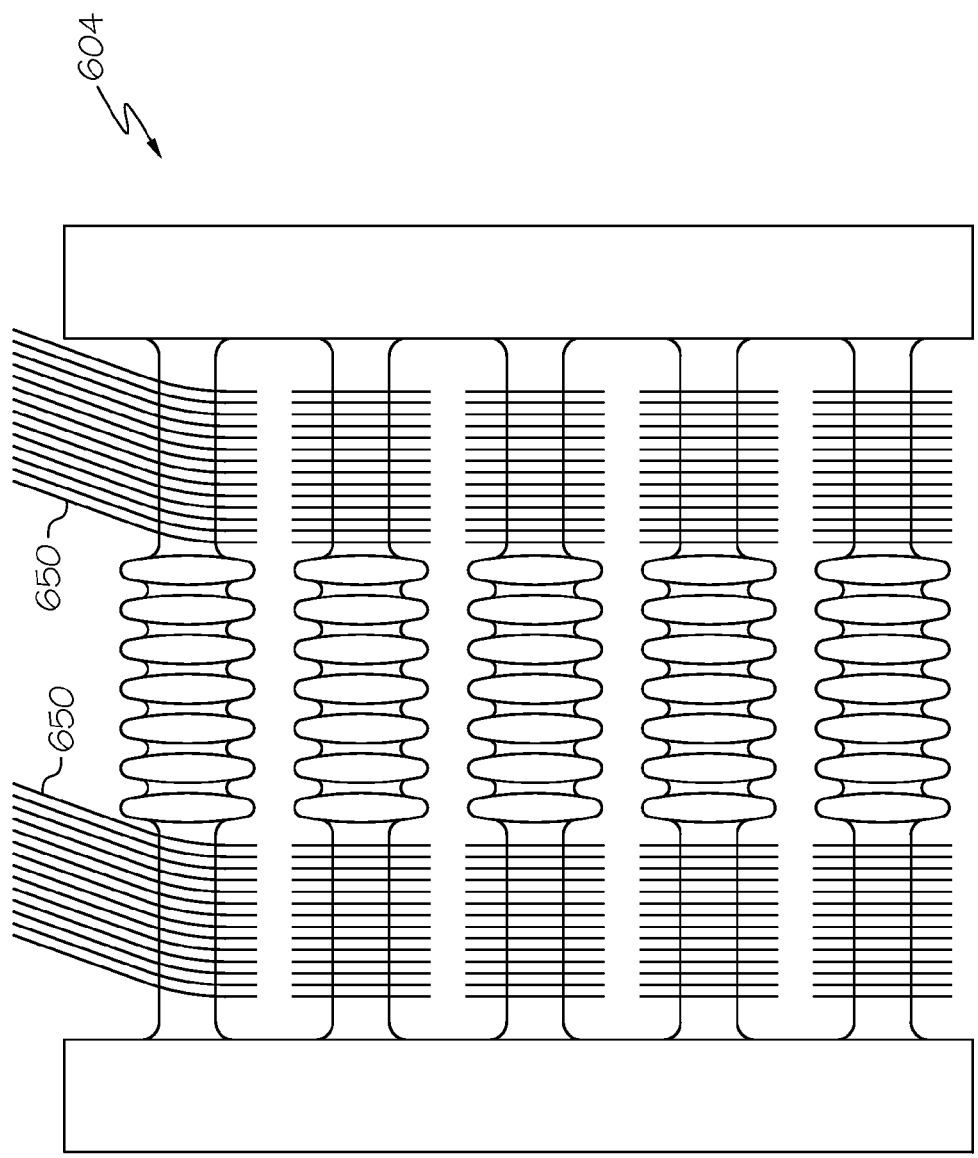
Figure 7:
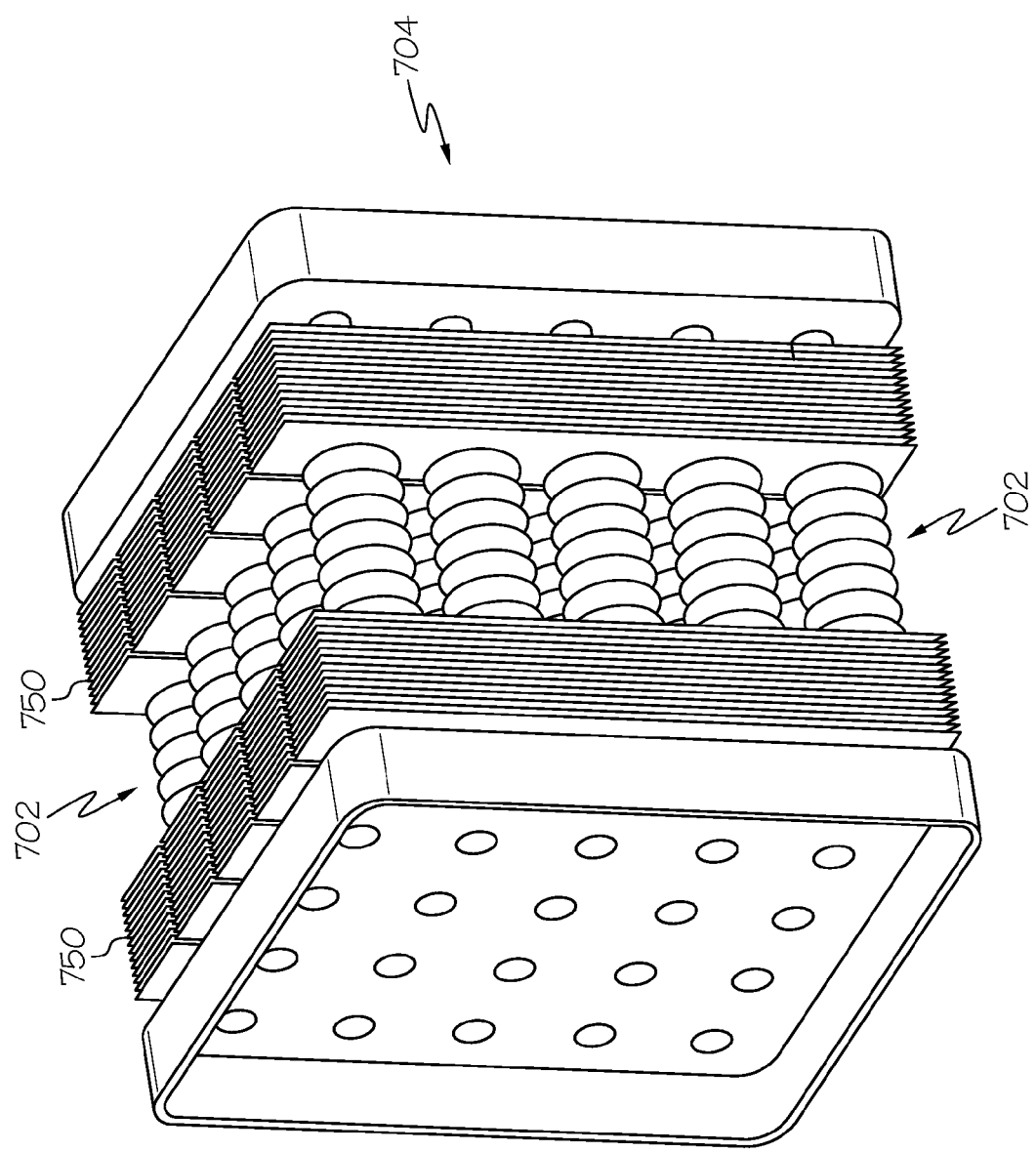
FIG. 7 is an isometric view of another unitary heat exchanger, according to yet another exemplary embodiment of the present invention.
Figure 8:
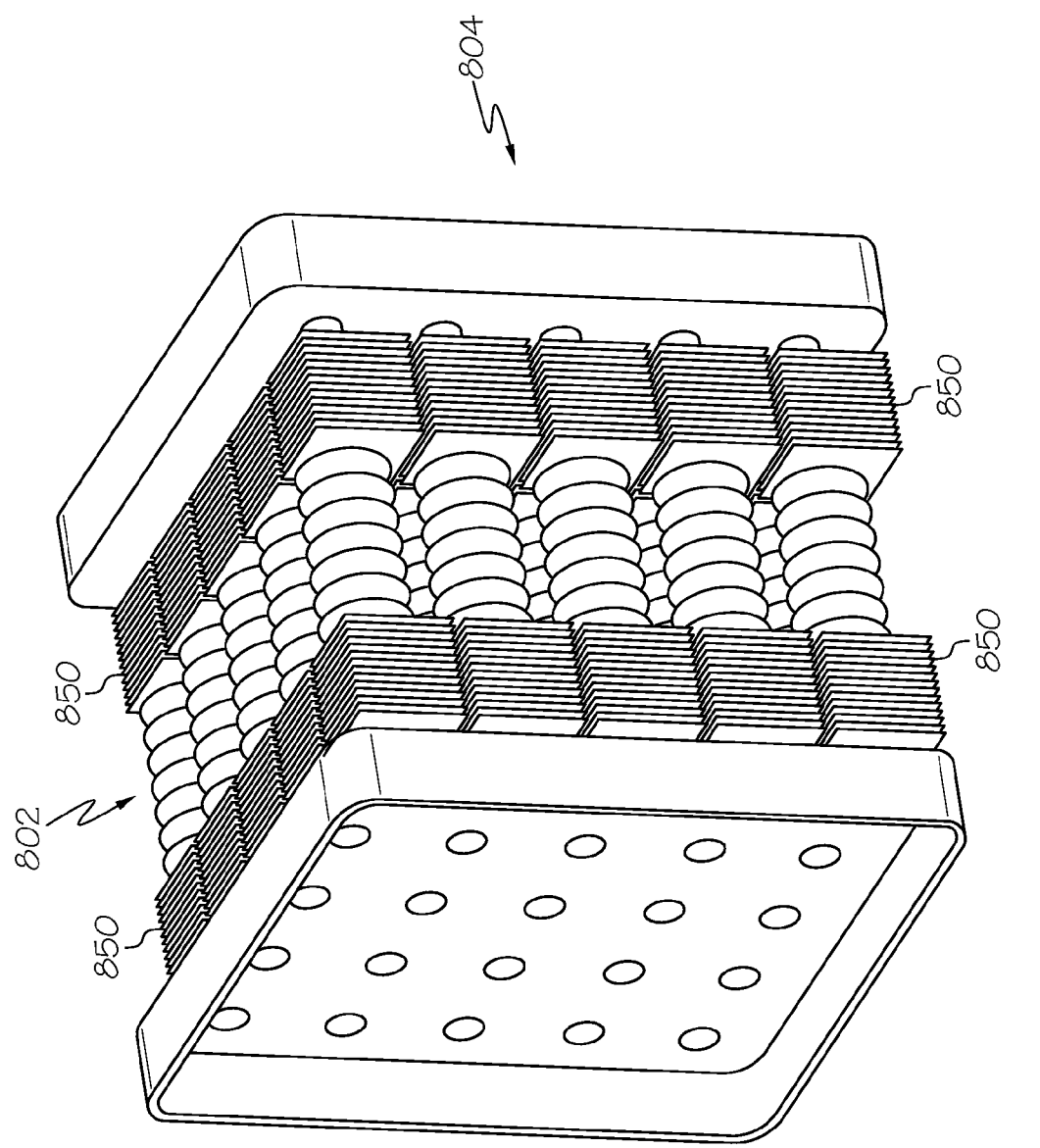
FIG. 8 is an isometric view of another unitary heat exchanger, according to yet another exemplary embodiment of the present invention

Referring now specifically to FIGS. 3 through 5, according to exemplary embodiments, the unitary heat exchangers 204 are conformal, in that each is disposed within and conforms to the curvature of the inner fan duct 126 and, as shown most clearly in FIG. 5, the unitary heat exchangers 204 may be coupled together with the inner fan duct 126 to form an annular ring. This configuration minimizes the installation space, minimizes transmission pressure loss, and maximizes the differential pressure across the unitary heat exchanger 204. While FIG. 4A illustrates a conformal unitary heat exchanger with regard to a cooling heat exchanger in a gas turbine engine, other shapes, sizes, and number of unitary heat exchangers are possible to conform to other implementations.

The unitary heat exchanger 204 is implemented as a tubular bundle type that includes a plurality of integrally-formed compliant heat exchanger tubes 402, a heat exchanger first flow passage 404, and a heat exchanger second flow passage 406. In the embodiment depicted in FIG. 4A, the plurality of integrally-formed compliant heat exchanger tubes comprise relatively straight tubes. Each heat exchanger first flow passage 404 includes an inlet port 408 in flow communication with an inlet plenum 410, and an outlet plenum 412 in flow communication with an outlet port 414. The inlet plenum 410 is defined by an inner wall 417, an outer wall 413, and endwalls. A portion of the outer wall 413 of the inlet plenum has been removed in FIG. 4A for ease of illustrating a plurality of tube inlets 415 in the inner wall 417. It is to be understood that each integrally-formed compliant heat exchanger tube is associated with a tube inlet 415 (and a tube outlet (not shown), as hereinafter described). Similarly, the outlet plenum 412 is defined by an inner plenum wall 422, an outer plenum wall 416, and endwalls. A plurality of the tube outlets (not shown) are provided in the inner plenum wall 422. The outlet plenum 412 is substantially a mirror image of the inlet plenum in the embodiment illustrated in FIG. 4A. An end portion of the outlet plenum has been removed in FIG. 4A. The integrally-formed compliant heat exchanger tubes 402 extend between and are integral with the inlet and outlet plenums to define the heat exchanger first flow passage. Each inlet port 408 is configured to receive the relatively hot air 202 from within the engine case 116, and each heat exchanger second flow passage 406 is configured to receive fan air from the bypass flow passage 122. The relatively hot air 202 that flows into the heat exchanger inlet port 408 flows into the inlet plenum 410, then through the plurality of inlets 415 in the inner wall 417 of the inlet plenum 410 and into the associated tubes 402 where it is cooled, and the cooled air 206 is discharged from the tubes 402 through associated tube outlets (not shown) in the inner wall of the outlet plenum and into the outlet plenum 412, before exiting from the outlet port 414. Each heat exchanger second flow passage 406 (FIG. 4A) is configured to direct the supplied fan air 203 across the associated tubes 402. The unitary heat exchangers 204 can each be configured such that the fan air flow may be either cross flow, counter flow, or a combination of both.

The tube inlets 415 are smoothly curved or contoured. This curvature or contour reduces inlet flow losses as compared to traditional sharp cornered tube inlets. In some examples, this flow loss can be reduced by as much as 90% by employing curved or contoured tube inlets. The tube inlets 415 are also counter-sunk with respect to the flow passage. This counter-sunk design allows for a smooth transition of cooling air from the inlet plenum into the tubes to minimize pressure drops. The plurality of inlets are configured to allow the first fluid to flow from the inlet plenum and into the heat exchanger tubes and provide compliance in the transition between the inlet plenum and the respective tube. The interface between the inlet plenum and the respective tube may include varying wall thickness features to allow such structural compliance.

Referring now specifically to FIGS. 4A through 4D, each integrally-formed compliant heat exchanger tube 402 comprises a tubular member 411 defining a flow path (a portion of the first flow passage) between the proximal tube end 407 and the distal tube end 409, the tubular member 411 defined by a tubular wall 413 (FIG. 4C) defining a tube interior 418 comprising the flow path and a tube exterior 420. Arrow 419 in FIG. 4C depicts the direction of flow in the tube interior 418 (i.e., in a portion of the first flow passage) and arrow 421 depicts the direction of flow from the tube exterior 420 (i.e., in a portion of the second flow passage). The plurality of integrally-formed compliant heat exchanger tubes have substantially coextensive proximal tube ends 407 that may be integrally-formed at the tube inlets with the inlet plenum and substantially coextensive distal tube ends 409 that may be integrally-formed with the outlet plenum at corresponding tube outlets (not shown).

Each integrally-formed compliant heat exchanger tube 402 (FIGS. 4B and 4C) comprises a plurality of integral heat transfer fins 450 extending radially outwardly from at least one portion of the tubular member. The plurality of integral heat transfer fins 450 may be arranged in one or more fin groups. For example, the integrally-formed compliant heat exchanger tubes of the unitary heat exchanger 204 depicted in FIG. 4A include a first fin group 452 and a second fin group 454. The first and second fin groups 452 and 454 are located proximate the proximal tube end and the distal tube end, respectively. The fin groups may be selectively located at axial positions other than as depicted, their optimum position determined by computational fluid/heat transfer analysis and by corresponding stress analysis, as commonly performed by one skilled in the art. The fins in each fin group may be substantially in parallel relationship with each other as depicted, for optimal flow performance. The spacing between the heat transfer fins within each fin group and relative to other fin groups in the same or a different integrally-formed heat exchanger tube may be the same or different. During the heat exchange operation, the plurality of integral heat transfer fins are exposed to the supplied fan air 203 in the second flow passage which cools the heat transfer fins, with the high thermal conductivity of the fin material allowing increased heat transfer. The integral heat transfer fins may be generally annular in shape as depicted in FIGS. 4A through 4C or may have other shapes and may be selectively oriented to direct fluid flow turning into and out of the plurality of integrally-formed compliant heat exchanger tubes, i.e., to act as inlet and/or outlet (exit) louvers as hereinafter described. Fin spacing, locations, and groupings are determined by computational fluid/heat transfer analysis and by corresponding stress analysis to optimize the overall performance of the unitary heat exchanger with respect to pressure drops, heat transfer, stress, and weight. Although unitary heat exchanger 204 is depicted with fourteen fins in two fin groups, it will be appreciated that this is merely exemplary, and that other numbers of fins 450 and fin groups may be used. Similarly, the number of fins and fin groups in other depicted unitary heat exchangers as described herein is merely exemplary, and other numbers of fins and fin groups may be used.

Each integrally-formed compliant heat exchanger tube 402 further comprises an integral bellows portion 425 (shown best in encircled region A of FIG. 4C). The integral bellows portion 425 may be selectively positioned in substantially a central portion between the first fin group 452 and the second fin group 454, between the inlet and outlet plenums in the unitary heat exchanger 204. Finite element analysis and different aero/thermal/stress modeling tools as known to one skilled in the art may be used to optimize the location of the integral bellows portion. While the integral bellows portion is depicted in unitary heat exchanger 204 (and in unitary heat exchangers 604, 704, and 804) in substantially a central portion of the relatively integrally-formed compliant heat exchanger tubes, between the first fin group and the second fin group thereof, it is to be understood that the integral bellows portion may be selectively located in other positions along the length of the integrally-formed compliant heat exchanger tube, and in other relative positions to the fin groups. While each integrally-formed compliant heat exchanger tube 402 is illustrated with a single integral bellows portion, it is to be understood that the integrally-formed compliant heat exchanger tube 402 (and tube 602, 702, and 802) may include additional integral bellows portions.

Figure 13:
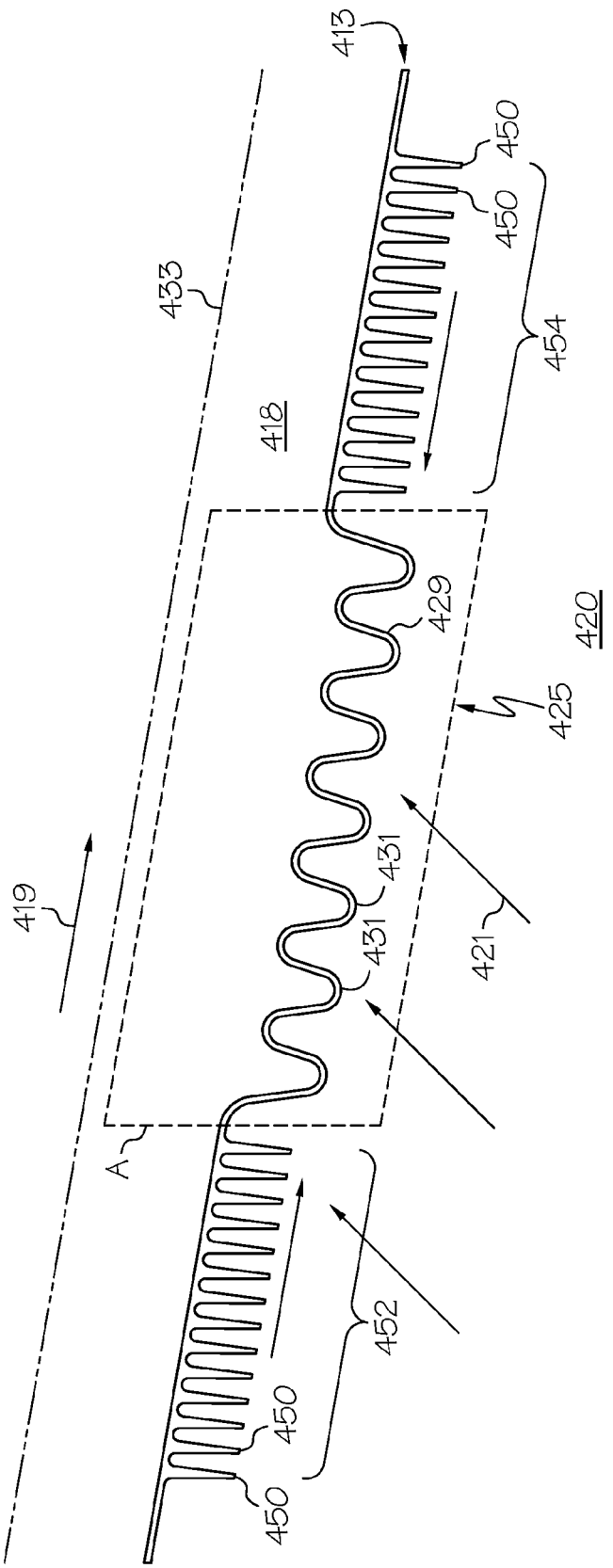
FIG. 13 is a simplified and enlarged cross-sectional view of a portion of an exemplary integrally-formed compliant heat exchanger tube similar to that shown in FIG. 4B, illustrating an integral bellows portion thereof comprising a bellows, according to yet another exemplary embodiment.

Still referring to FIG. 4C, in an embodiment, the integral bellows portion 425 comprises a slip joint 427 and a corresponding bellows 429 formed in the tubular wall of the tubular member. More specifically, the slip joint 427 is formed in the inner wall surface (thereby comprising an "inner slip joint" that is not visible in FIGS. 4A through 4B) and the bellows 429 is formed in the outer wall surface, i.e., the slip joint 427 is situated within the tube interior 418. The bellows 429 has a first end that transitions into the outer wall surface and transitions into a first section a of the inner wall surface, and a second end that transitions into the outer wall surface and transitions into a second section b of the inner wall surface. In another embodiment (FIG. 13), the portion of the inner wall surface including the slip joint is omitted from the integral bellows portion 425 (encircled region A).

The slip joint 427 is an overlapping slip joint, in that the first section a of the inner wall surface is offset from the second section b of the inner wall surface in the integral bellows portion of the tubular wall, but able to be slid together during thermal contraction and expansion of the unitary heat exchanger 204, i.e., the first and second sections of the inner wall surface are slidingly interconnected in overlapped relation. More specifically, the first section a of the inner wall surface of the tubular wall in the integral bellows portion of the tubular member overlaps the second section b of the inner wall surface of the tubular wall in the integral bellows portion 425 of the tubular wall to define the slip joint 427. The slip joint permits thermal expansion and contraction (i.e., relative motion) of the integrally-formed heat exchanger tube 402 relative to the inlet and outlet plenums 410 and 412 without causing thermo-mechanical failure. The faces of the slip joint 427 define a backward-facing step 432 in the tube interior. The term "backward-facing" refers to the step facing opposite the flow direction in the tube interior (indicated by arrow 419). During operation, some flow turbulence occurs at the backward-facing step 432. The backward-facing step substantially prevents fluid back up in the tube interior that would otherwise cause recirculation and pressure drops within the integrally-formed compliant heat exchanger tube, i.e., the backward-facing step of the slip joint controls flow distortion as fluid is conveyed from the inlet to the outlet of the unitary heat exchanger. The shape of the backward-facing step is uniform and continuous around the entire inner circumference of the tubular member.

Still referring to FIG. 4C and now to FIG. 4D, the bellows 429 of the integral bellows portion 425 comprises a plurality of convolutes 431 that extend radially outwardly and circumscribe at least a portion of the integrally-formed compliant heat exchanger tube 402. The convolutes are spaced from one another in the axial direction of the tube. The bellows 429 may be formed such that a first pitch length 435 between adjacent convolutes may be the same or different than a second pitch length 437 between two other adjacent convolutes. Similarly, a first wall thickness 439 may be the same or different than a second wall thickness 441. The wall thickness distribution in the bellows may be tapered gradually to provide optimal stiffness or improved stress distribution in the bellows. Similarly, a first inner radius 443 may be the same or a different size than a second inner radius of curvature 445, and a first outer radius 447 may be the same or a different size than a second outer radius of curvature 442. Various combinations of pitch lengths, thickness distributions, inner radius of curvatures, and outer radii of curvatures may be employed in the bellows to optimize the configuration for performance, life, cost, and weight. Fabrication of the unitary heat exchangers having the integrally-formed compliant heat exchanger tubes using additive manufacturing techniques as hereinafter described enables the bellows diameter 451 at a first end to be the same or different from the bellows diameter 453 at a second end if desired for enhanced performance or reduced weight, among other reasons.

The bellows 429 is compressible and expandable to accommodate thermal expansion and contraction of the integrally-formed compliant heat exchanger tube. The convolutes provide such compliance for accommodating strain (relative movement) during thermal contraction and expansion. The bellows may be axisymmetrically formed about a tube centerline 433. Each end of the bellows forms a seal with the remaining portions of the tubular wall, thereby preventing any leakage from inside the integrally-formed compliant heat exchanger tube 402. The bellows absorbs linear growth caused by thermal expansion. Small fluidic interaction from inside the heat exchanger tube through the slip joint can be tolerated as the bellows acts as a seal, but it is desirable to avoid leakage to the tube exterior. Thus, the slip joint and bellows of the integral bellows portion cooperate to form a compliant sealed joint for the integrally-formed compliant heat exchanger tube. The integral bellows portion of each tube absorbs thermal movement and vibration thereof. The integral bellows portion provides the compliance to the integrally-formed compliant heat exchanger tube, thereby minimizing thermo-mechanical fatigue (TMF) during thermal contraction and expansion. As noted previously, FIG. 5 depicts the unitary heat exchanger 204 of FIG. 4A configured to be coupled to other unitary heat exchangers 204 to form an annular ring.

Referring now to FIGS. 6A and 6B, 7, and 8, other exemplary unitary heat exchangers 604, 704, and 804 are illustrated. Unitary heat exchangers 604 (FIGS. 6A and 6B), 704 (FIG. 7), and 804 (FIG. 8) are identical to unitary heat exchanger 204 of FIG. 4A (the outer wall of the inlet plenum 610 and the slip joint of the integral bellows portion are not shown in FIGS. 6A and 6B (the outer wall of the inlet plenum 610 has been omitted for ease of illustration to show inner wall 617 and tube inlets 615), FIG. 7, and FIG. 8), except that: i) the plurality of heat transfer fins 650 of the relatively straight integrally-formed compliant heat exchanger tubes 602 of unitary heat exchanger 604 (FIGS. 6A and 6B) are substantially square or rectangular and oriented as exit louvers to direct flow; ii) the plurality of heat transfer fins 750 of the relatively straight integrally-formed compliant heat exchanger tubes 702 of unitary heat exchanger 704 (FIG. 7) are substantially square or rectangular with edges that contact the heat transfer fins of an adjacent integrally-formed compliant heat transfer tube; and iii) the plurality of heat transfer fins 850 of the relatively straight integrally-formed compliant heat exchanger tubes 802 of unitary heat exchanger 804 (FIG. 8) are substantially square-shaped or rectangular and have edges that are spaced apart from the heat transfer fins of an adjacent integrally-formed compliant heat exchanger tube. The relatively straight integrally-formed compliant heat exchanger tubes in each of the unitary heat exchangers 204, 604, 704, and 804 may be closely packed making the resulting unitary heat exchanger more compact relative to conventional heat exchangers and to unitary heat exchangers 904 and 1004 as hereinafter described.

Figure 9:
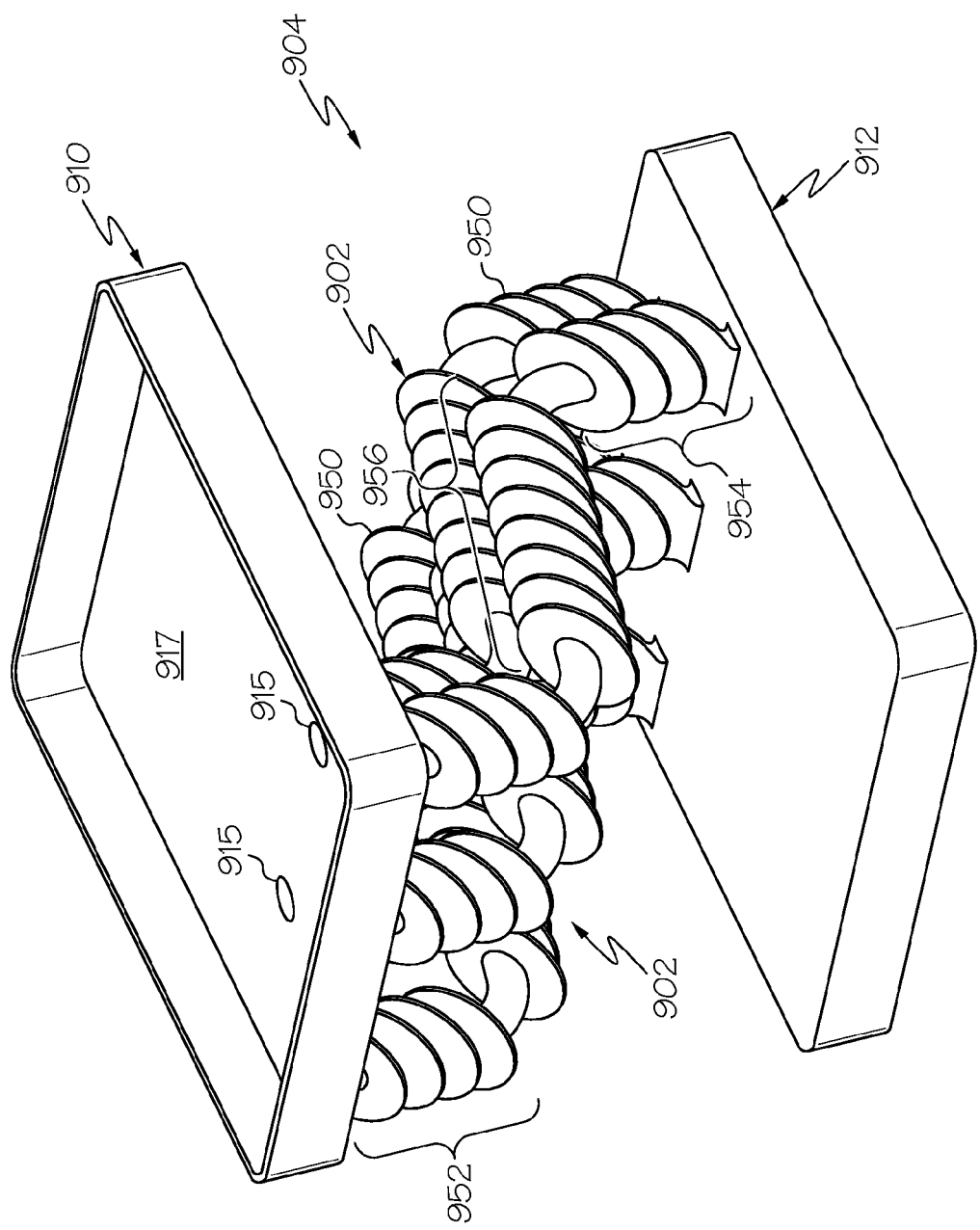
FIG. 9 is an isometric view of another unitary heat exchanger that may be used to implement the cooling air system depicted in FIG. 2, according to yet another exemplary embodiment.

Referring now to FIG. 9, in accordance with another exemplary embodiment, a unitary heat exchanger 904 is identical to the unitary heat exchanger of FIG. 4A, except that the plurality of integrally-formed compliant heat exchanger tubes 902 comprise curved tubular members and there is no integral bellows portion. The plurality of integrally-formed compliant heat exchanger tubes 902 extend between and are integral with inlet and outlet plenums 910 and 912. The outer wall of the inlet plenum 910 has been omitted in FIG. 9 for ease of illustration. A plurality of tube inlets 915 are provided in the inner wall 917 of the inlet plenum 910. While only two tube inlets 915 are depicted in FIG. 9 for ease of illustration, it is to be understood that each integrally-formed compliant heat exchanger tube is associated with a tube inlet 915 (and a tube outlet (not shown). It is also to be understood that unitary heat exchanger 904 may include a lesser or greater number of integrally-formed compliant heat exchanger tubes than are shown in FIG. 9. The integrally-formed compliant heat exchanger tubes 902 may be curved, for example, in either the tangential or radial directions, or may be curved in both the tangential and radial directions to provide optimal compliance and thereby increase thermo-mechanical fatigue strength. For example, as shown in FIG. 9, the integrally-formed compliant heat exchanger tubes 902 may be configured as substantially S-shaped heat exchanger tubes. Each substantially S-shaped heat exchanger tube includes a substantially transversely extending curved central portion and curved proximal and distal tube end portions, the curved proximal and distal tube end portions extending outwardly away from the transversely extending curved central portion. As with unitary heat exchanger 204, the plurality of integral heat transfer fins 950 in unitary heat exchanger 904 are arranged in one or more fin groups. In unitary heat exchanger 904, the plurality of integral heat transfer fins 950 are arranged in a first fin group 952 proximate the proximal tube end, a second fin group 954 proximate the distal tube end, and a third fin group 956. The plurality of heat transfer fins 950 extend radially outwardly along at least a portion of the tubular member in the same manner, as described above. As noted previously, the positioning (locations) and number of fins and fin group(s) may vary. The plurality of integrally-formed compliant heat exchanger tubes 902 and heat transfer fins 950 are configured to achieve minimum cross sectional area and pressure drop with respect to the cooling flow direction. Heat transfer fins may be omitted in areas where the tube 902 bends to minimize stress concentrations and to maximize compliance throughout the unitary heat exchanger. While heat exchanger tube 902 does not include an integral bellows portion, it is to be understood that one or more integral bellows portions may be included in the one or more tubes 902 of unitary heat exchanger 904. As noted previously, the integral bellows portion comprises a bellows (FIG. 13) and may further comprise a slip joint (FIG. 4C).

Figure 10:
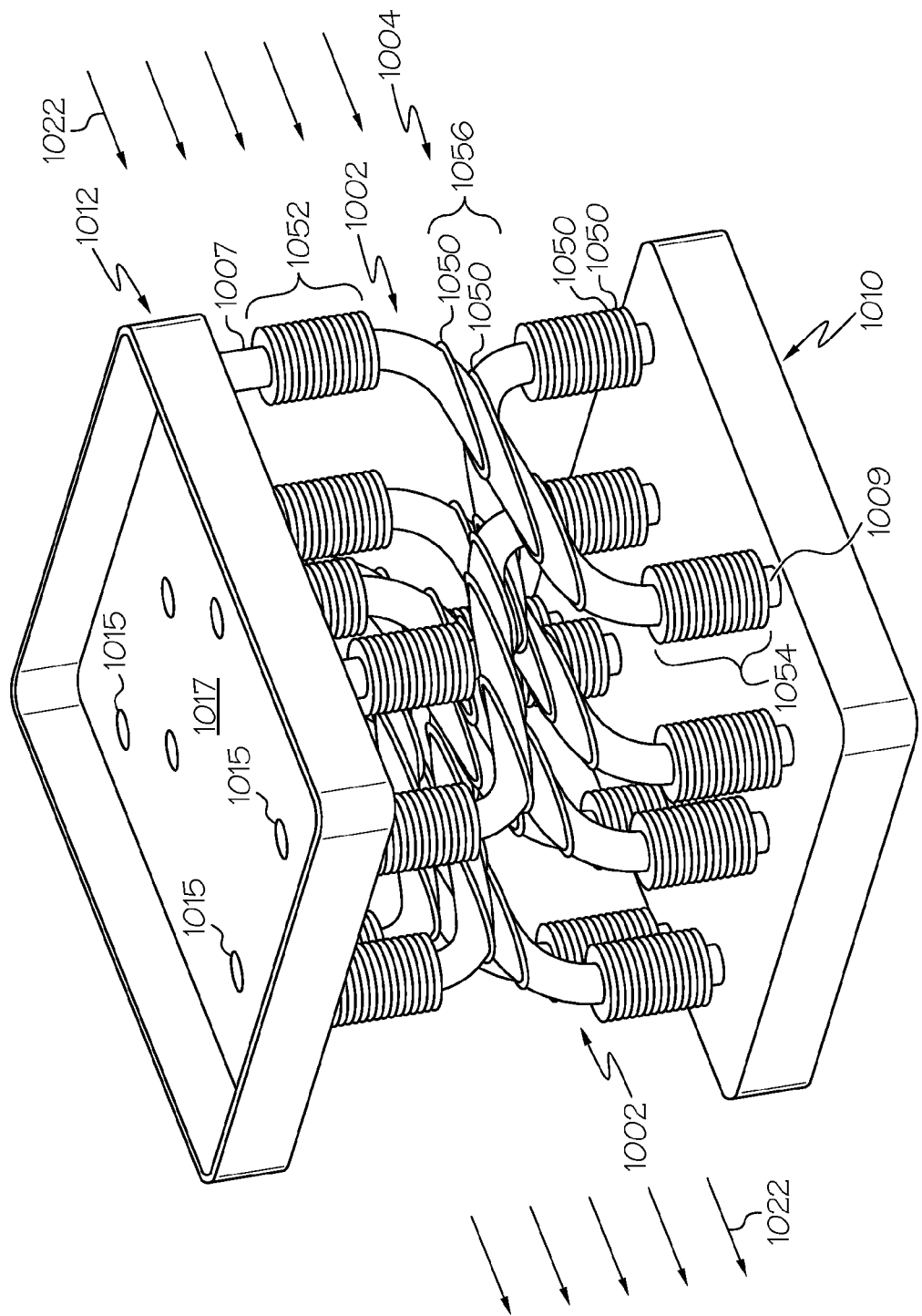
FIG. 10 is an isometric view of another unitary heat exchanger that may be used to implement the cooling air system depicted in FIG. 2, according to yet other exemplary embodiments.

FIG. 10 depicts another exemplary unitary heat exchanger 1004 having an alternative curved configuration for the plurality of integrally-formed compliant heat exchanger tubes. The unitary heat exchanger 1004 is identical to the unitary heat exchanger of FIG. 4A, except that the plurality of integrally-formed compliant heat exchanger tubes 1002 comprise curved tubular members in which adjacent curved integrally-formed compliant heat exchanger tubes together form an "X" shape as viewed isometrically (FIG. 10), a proximal tube end 1007 is offset from a distal tube end 1009 of each integrally-formed compliant heat exchanger tube 1002, and there is no integral bellows portion. In addition, the heat transfer fins 1050 of the third fin group (the third fin group in FIG. 10 is identified with the reference numeral 1056) are depicted as more widely spaced than the heat transfer fins 1050 of the first and second fin groups 1052 and 1054. As with unitary heat exchanger 904, the plurality of integrally-formed compliant heat exchanger tubes 1002 and heat transfer fins 1050 in unitary heat exchanger 1004 are configured to achieve minimum cross sectional area and pressure drop with respect to the cooling flow direction 1022. Heat transfer fins may be omitted in areas where the tube 1002 bends to minimize stress concentrations and to maximize compliance throughout the unitary heat exchanger structure. The plurality of integrally-formed compliant heat exchanger tubes 1002 extend between and are integral with inlet and outlet plenums 1010 and 1012. The outer wall of the inlet plenum 1010 has been omitted in FIG. 10 for ease of illustration. A plurality of tube inlets 1015 are provided in the inner wall 1017 of the inlet plenum 1010. While only six tube inlets 1015 are depicted in FIG. 10 for ease of illustration, it is to be understood that each integrally-formed compliant heat exchanger tube is associated with a tube inlet 1015 (and a tube outlet (not shown)). It is also to be understood that unitary heat exchanger 1004 may include a lesser or greater number of integrally-formed compliant heat exchanger tubes, fins, and fin groups than are shown in FIG. 10. In addition, while heat exchanger tube 1002 does not include an integral bellows portion as previously described, it is to be understood that one or more integral bellows portions may be included in the one or more tubes 1002 of unitary heat exchanger 1004. As noted previously, the integral bellows portion comprises a bellows (FIG. 13) and may further comprise a slip joint (FIG. 4C).

While integrally-formed compliant heat transfer tubes have been described with particular curved configurations, it is to be understood that curved integrally-formed compliant heat transfer tubes may be curved in other manners to provide compliance for enhancing thermo-mechanical fatigue strength. In addition, while unitary heat exchangers having relatively straight integrally-formed compliant heat exchanger tubes or curved integrally-formed compliant heat exchanger tubes have been described, it is to be understood that according to exemplary embodiments, a single unitary heat exchanger may include both relatively straight and curved integrally-formed compliant heat exchanger tubes. In addition, a single unitary heat exchanger may include combinations of heat exchanger tubes 402, 602, 702, 802, 902, 1002, and variations thereof.

The relatively straight and the curved integrally-formed compliant heat exchanger tubes may be fabricated with internal heat transfer augmentation features such as spiral grooves or turbulators, dimples, spherical bumps, and other internal augmenting devices as are known to those having ordinary skill in the art. In addition, the external wall surfaces of the integrally-formed compliant heat exchanger tubes may be enhanced with oval or airfoil shapes to reduce pressure losses in the tube bundle while simultaneously enhancing external surface area. External heat transfer augmentation features may be employed such as dimples or rougheners to speed transition to turbulent flow and to augment heat transfer in the tubular bundle.

While unitary heat exchangers having integrally-formed compliant heat exchanger tubes have been described, it is to be understood that, according to another embodiment, the integrally-formed compliant heat exchanger tubes (e.g., tubes 402, 602, 702, 802 and tubes 902 and 1002 (inclusive of the integral bellows portion)) may be separately available, in which case they can be brazed or otherwise coupled to an inlet plenum, an outlet plenum, or both to form a multi-piece heat exchanger (or simply a "heat exchanger" as used herein).

Figure 11:
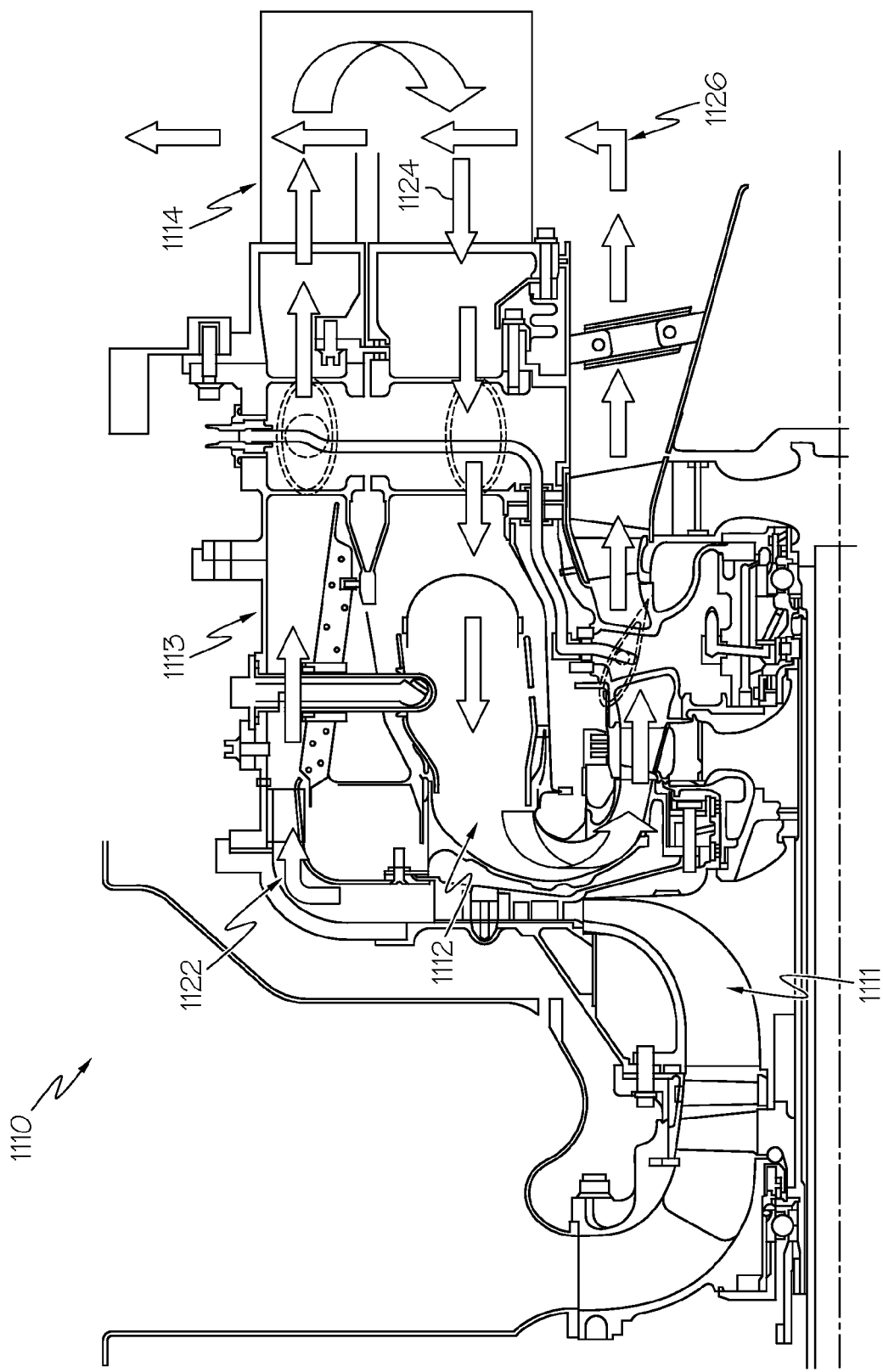
FIG. 11 depicts a simplified cross sectional view of a portion of another exemplary gas turbine engine.

As discussed above, the unitary heat exchangers in accordance with the present invention can be embodied in a variety of forms for use in gas turbine engines and in other applications. The previously described cooling air heat exchanger is merely one embodiment. In another embodiment, the unitary heat exchangers of the present invention can be implemented as recuperators for heating compressed air prior to the entry thereof in the combustor. Referring now to FIG. 11, a simplified cross section view of a portion of another exemplary gas turbine engine 1110 is depicted. In this exemplary engine design, cold air flows from compressor 1111 along a first flow path 1122 and into recuperator 1114. As the air flows through the recuperator, the cold compressed air may be heated by the flow of hot exhaust gas from combustor 1112, positioned within combustor case 1113, by way of exhaust gas flow path 1126. The heated compressed air can then flow along the second flow path 1124 and into combustor 1112. The heated compressed air may then be used in the combustion process in combustor 1112 to produce exhaust gas which can be cycled through recuperator 1114 along exhaust flow path 1126. (The gas turbine engine with recuperator configuration shown by way of example in FIG. 11 is described in greater detail in commonly-assigned U.S. Pat. No. 7,124,572, titled "Recuperator and turbine support adapter for recuperated gas turbine engines," issued Oct. 24, 2006, the contents of which are incorporated by reference herein in their entirety.)

Recuperator 1114 beneficially includes the features as described above with regard to cooling air unitary heat exchanger. These features may include one or more of structurally compliant, counter-sunk inlets, varying wall thickness features, curved or contoured inlets, and external or internal heat transfer augmentation features. However, the recuperator 1114 may be sized and shaped to accommodate its functionality as a recuperator. Generally speaking, the length of tubes may be modified, the number of tubes may be modified, the inside and outside diameters and wall thickness of the tubes may be modified, the shape of the overall unitary heat exchanger may be modified, and the flow configuration may be modified, among other things, to conform to the application.

In general, it is expected that, based on the teachings herein, a person having ordinary skill in the art will be able to implement the unitary heat exchangers having the integrally-formed heat exchanger tubes and the heat exchange system including the same as described above as desired for use in a wide variety of applications. As such, the various possible implementations of the unitary heat exchangers and heat exchange systems should not be considered limited to any of the embodiments presented herein.

It will be appreciated that certain features of the presently described unitary heat exchangers having integrally-formed compliant heat exchanger tubes, the integrally-formed compliant heat exchanger tubes, and the heat transfer systems including the same would be expensive to manufacture using conventional manufacturing techniques. As such, designs in accordance with the present disclosure are not known in the prior art. However, the present inventors have discovered that using additive manufacturing techniques, or other recently developed manufacturing techniques, designs in accordance with the present disclosure can be manufactured at a significantly reduced cost as compared to traditional manufacturing techniques. Additive manufacturing techniques include, for example, direct metal laser sintering (DMLS—a form of direct metal laser fusion (DMLF)) with nickel base super-alloys, low density titanium, and aluminum alloys. DMLS is discussed in greater detail below. Another technique includes electron beam melting (EBM) with titanium, titanium aluminide, and nickel base superalloy materials. Still further, casting or metal injection molding (MIM) may be employed.

The unitary heat exchangers, such as the cooling air heat exchangers 204, 604, 704, 804, 904, and 1004 or the recuperator 1114 as shown in FIG. 11, may be manufactured using additive manufacturing techniques. The integrally-formed compliant heat exchanger tubes may be manufactured using additive manufacturing techniques. Additive manufacturing techniques may begin with providing a model, such as a design model, of the heat exchange system. The model may be defined in any suitable manner. For example, the model may be designed with computer aided design (CAD) software and may include three-dimensional ("3D") numeric coordinates of the entire configuration of the heat exchange system including both external and internal surfaces. In one exemplary embodiment, the model may include a number of successive two-dimensional ("2D") cross-sectional slices that together form the 3D component.

The unitary heat exchanger is formed according to the model, using a rapid prototyping or additive layer manufacturing process. Some examples of additive layer manufacturing processes include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication with few or no geometric constraints, fast material processing time, and innovative joining techniques. In one particular exemplary embodiment, direct metal laser fusion (DMLF) may be used to produce the heat exchange system. DMLF is a commercially available laser-based rapid prototyping and tooling process by which complex parts may be directly produced by precision melting and solidification of metal powder into successive layers of larger structures, each layer corresponding to a cross-sectional layer of the 3D component. DMLF may include direct metal laser sintering (DMLS), as previously noted.

Figure 12:
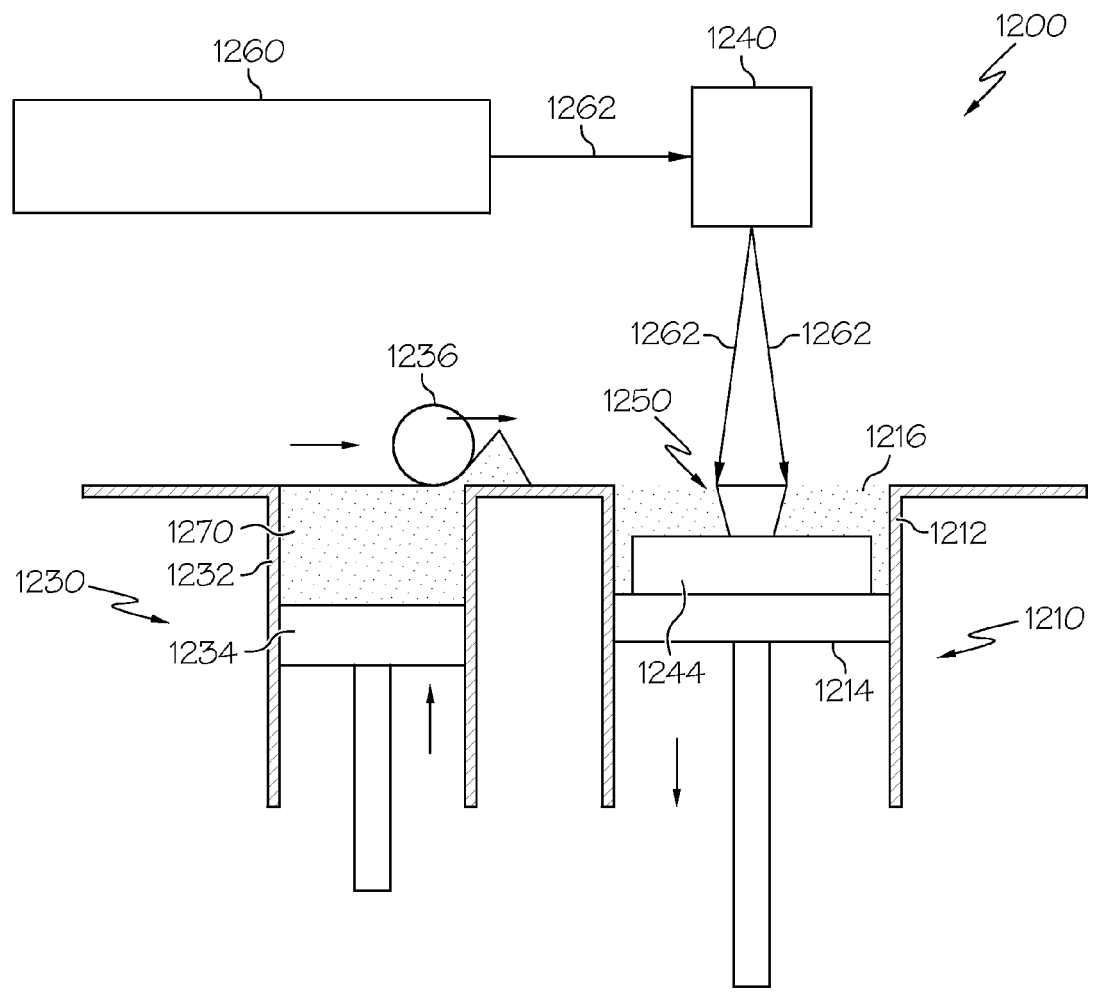
FIG. 12 illustrates an exemplary additive manufacturing system suitable for use in manufacturing the unitary heat exchangers having the integrally-formed compliant heat exchanger tubes, the integrally-formed compliant heat exchanger tubes, and the heat exchange systems including the same in accordance with the present disclosure.

FIG. 12 is a schematic view of an exemplary DMLF system 1200 for manufacturing the heat exchange system, for example cooling air unitary heat exchangers 204, 604, 704, 804, 904, or 1004 or the recuperator 1114 as shown in FIG. 11, in accordance with an exemplary embodiment. The system 1200 includes a fabrication device 1210, a powder delivery device 1230, a scanner 1240, and a laser 1260 that function to manufacture the article 1250 (e.g., the heat exchange system) with build material 1270. The fabrication device 1210 includes a build container 1212 with a fabrication support 1214 on which the article 1250 is formed and supported. The fabrication support 1214 is movable within the build container 1212 in a vertical direction and is adjusted in such a way to define a working plane 1216. The delivery device 1230 includes a powder chamber 1232 with a delivery support 1234 that supports the build material 1270 and is also movable in the vertical direction. The delivery device 1230 further includes a roller or wiper 1236 that transfers build material 1270 from the delivery device 1230 to the fabrication device 1210.

During operation, a base block 1244 may be installed on the fabrication support 1214. The fabrication support 1214 is lowered and the delivery support 1234 is raised. The roller or wiper 1236 scrapes or otherwise pushes a portion of the build material 1270 from the delivery device 1230 to form the working plane 1216 in the fabrication device 1210. The laser 1260 emits a laser beam 1262, which is directed by the scanner 1240 onto the build material 1270 in the working plane 1216 to selectively fuse the build material 1270 into a cross-sectional layer of the article 1250 according to the design. More specifically, the speed, position, and other operating parameters of the laser beam 1262 are controlled to selectively fuse the powder of the build material 1270 into larger structures by rapidly melting the powder particles that may melt or diffuse into the solid structure below, and subsequently, cool and re-solidify. As such, based on the control of the laser beam 1262, each layer of build material 1270 may include unfused and fused build material 1270 that respectively corresponds to the cross-sectional passages and walls that form the article 1250. In general, the laser beam 1262 is relatively low power to selectively fuse the individual layer of build material 1270. As an example, the laser beam 1262 may have a power of approximately 50 to 500 Watts, although any suitable power may be provided.

Upon completion of each layer, the fabrication support 1214 is lowered and the delivery support 1234 is raised.

Typically, the fabrication support 1214, and thus the article 1250, does not move in a horizontal plane during this step. The roller or wiper 1236 again pushes a portion of the build material 1270 from the delivery device 1230 to form an additional layer of build material 1270 on the working plane 1216 of the fabrication device 1210. The laser beam 1262 is movably supported relative to the article 1250 and is again controlled to selectively form another cross-sectional layer. As such, the article 1250 is positioned in a bed of build material 1270 as the successive layers are formed such that the unfused and fused material supports subsequent layers. This process is continued according to the modeled design as successive cross-sectional layers are formed into the completed unitary heat exchanger. Unfused build material powder as a result of forming the internal slip joint (if present) may be removed from the completed unitary heat exchanger through removal holes in the inner wall surface of the tubular member in encircled region A (see, e.g., FIG. 4C)

The delivery of build material 1270 and movement of the article 1250 in the vertical direction are relatively constant and only the movement of the laser beam 1262 is selectively controlled to provide a simpler and more precise implementation. The localized fusing of the build material 1270 enables more precise placement of fused material to reduce or eliminate the occurrence of over-deposition of material and excessive energy or heat, which may otherwise result in cracking or distortion. The unused and unfused build material 1270 may be reused, thereby further reducing scrap.

Any suitable laser and laser parameters may be used, including considerations with respect to power, laser beam spot size, and scanning velocity. As a general matter, the build material 1270 may be formed by any suitable powder, including powdered metals, such as a stainless steel powder, and alloys and super alloy materials, such as nickel-based or cobalt superalloys. In one exemplary embodiment, the build material 1270 is a high temperature nickel base super alloy such as IN718. In other embodiments, MAR-M-247, IN738, titanium, aluminum, titanium-aluminide, or other suitable alloys may be employed. In general, the powder build material 1270 may be selected for enhanced strength, durability, and useful life, particularly at high temperatures, although as described below, the powder build material 1270 may also be selected based on the intended function of the area being formed.

When the heat exchange system is complete, it is removed from the additive manufacturing system (e.g., from the DMLF system 1200). The complete heat exchange system may undergo finishing treatments. Finishing treatments may include, for example, aging, annealing, quenching, peening, polishing, hot isostatic pressing (HIP), or coatings. For example, during a HIP process, an encapsulation layer is applied to the article and pressure and heat are applied to remove or reduce any porosity and cracks internal to or on the surface of the component, as described in U.S. patent application Ser. No. 12/820,652, titled "METHODS FOR MANUFACTURING TURBINE COMPONENTS," filed Jun. 22, 2010, and published as United States Patent Application Publication No. 2011/0311389, published Dec. 22, 2011, the contents of which are herein incorporated by reference in their entirety. The encapsulation layer functions to effectively convert any surface porosity and cracks into internal porosity and cracks, and after the application of pressure and heat, removes or reduces the porosity and cracks. Such encapsulation layers may be subsequently removed or maintained to function as an oxidation protection layer.

In one exemplary embodiment, the encapsulation layer may be a metal or alloy that is compatible with the substrate and may be applied by a plating or coating process, as described below. In one embodiment, the HIP process may be performed at a processing temperature in a range of about 1000° C. to about 1300° C. and may be performed at a pressure in a range of about 1 ksi to about 25 ksi for a time period of about 1 to about 10 hours. In other embodiments, the HIP processing temperature, pressure, and time may be smaller or larger to form a compacted solid having negligible porosity.

If necessary, the heat exchange system may be machined to final specifications. At this point, "the heat exchange system" as referred to herein regarding additive manufacturing techniques corresponds with the finished heat exchange system shown in the figures. In further steps (not shown), the heat exchange system/unitary heat exchanger may be tested and installed in a gas turbine engine, as shown in FIGS. 2 and 11.

While formation of a single heat exchange system has been described, it is to be understood that more than one heat exchange system may be manufactured simultaneously on a common base block (e.g., base block 1244) to provide a common orientation and a known point of reference and formed as discussed above. Successive layers can be formed for the group of articles simultaneously according to a common module or design. For example, the powdered metal may be deposited across a single working plane and one or more lasers may selectively fuse the layers of each heat exchange system, either sequentially or simultaneously. The articles may then be lowered together for the formation of the next layer. Simultaneous fabrication of a number of heat exchange systems may reduce cost and variability of the manufacturing process.

Accordingly, it is to be appreciated that unitary heat exchangers having integrally-formed compliant heat exchanger tubes and heat exchange systems including the same have been provided. In particular, durability and life span of the heat exchange system may be improved by manufacturing each portion of the heat exchange system using designs that minimize the structural stresses that will be encountered during operation. Additionally, rapid prototyping and additive manufacturing techniques, including DMLF/DMLS reduces cracks and other issues and reduces costs and cycle time in the system design, particularly in the iterative environment of gas turbine engine component design. The heat exchangers and heat exchange systems have improved efficiency, reduced manufacturing costs, and increased operating lifespan over conventional heat exchangers, with less fluidic loss for improved engine cycle performance, and less weight.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A unitary heat exchanger comprising:
an inlet plenum defining a plurality of tube inlets and an inlet port, the inlet port to receive a first fluid;
an outlet plenum to discharge the received first fluid; and
a plurality of one-piece compliant heat exchanger tubes extending between and integral with the inlet and outlet plenums to form a one-piece heat exchanger and define a heat exchanger first flow passage, each one-piece compliant heat exchanger tube comprising:
a tubular member having a proximal tube end, a distal tube end and comprising a tubular wall that extends from the proximal tube end to the distal tube end, the tubular wall having an outer wall surface and an inner wall surface, the inner wall surface having a first section that extends from the proximal tube end toward the distal tube end and a second section that extends from the distal tube end toward the proximal tube end, and the first section overlaps the second section;
a plurality of integral heat transfer fins extending radially outwardly from at least one portion of the tubular member; and
an integral bellows portion defined between the proximal tube end and the distal tube end such that the integral bellows portion is spaced apart from the proximal tube end and the distal tube end, the integral bellows portion comprising a bellows defined in the outer wall surface and a slip joint in the inner wall surface, the bellows having a first end that transitions into the outer wall surface and transitions into the first section of the inner wall surface, and a second end that transitions into the outer wall surface and transitions into the second section of the inner wall surface, the slip joint defined by the overlap of the first section and the second section of the inner wall surface, the overlap of the first section and the second section defined in the bellows between the first end and the second end of the bellows and the overlap of the first section over the second section defines a backward-facing step portion that is opposite a flow direction of the first fluid inside the one-piece compliant heat exchanger tube and the backward-facing step portion creates flow turbulence within an interior of the tubular member.

2. The unitary heat exchanger of claim 1, wherein the plurality of one-piece compliant heat exchanger tubes comprise curved tubes.

3. The unitary heat exchanger of claim 1, wherein the bellows comprises a plurality of convolutes extending radially outwardly from a portion of the tubular member and circumscribing the tubular member, the plurality of convolutes being spaced from one another in the axial direction of the one-piece compliant heat exchanger tube, the bellows being compressible and expandable to accommodate thermal expansion and contraction of the one-piece compliant heat exchanger tube.

4. The unitary heat exchanger of claim 1, wherein the plurality of one-piece compliant heat exchanger tubes comprises curved tubes, relatively straight tubes, and combinations thereof.

5. The unitary heat exchanger of claim 1, wherein the plurality of one-piece heat exchanger tubes comprises relatively straight tubes that are closely packed to provide a compact unitary heat exchanger.

6. The unitary heat exchanger of claim 1, wherein the plurality of one-piece compliant heat exchanger tubes comprises curved tubes, relatively straight tubes, and combinations thereof.

7. An integrally-formed compliant heat exchanger tube comprising:
a tubular member having a proximal tube end, a distal tube end and a tubular wall that extends from the proximal tube end to the distal tube end, the tubular wall having an outer wall surface and an inner wall surface, the inner wall surface having a first section that extends from the proximal tube end toward the distal tube end and a second section that extends from the distal tube end toward the proximal tube end, and the first section overlaps the second section;
a plurality of integral heat transfer fins extending radially outwardly from at least one portion of the tubular member and formed in the outer wall surface; and
an integral bellows portion formed in the outer wall surface of the tubular wall, the integral bellows portion defined between the proximal tube end and the distal tube end such that the integral bellows portion is spaced apart from the proximal tube end and the distal tube end, the integral bellows portion and the plurality of heat transfer fins formed in the tubular member to form a one-piece heat exchanger tube, the integral bellows portion comprising a bellows in the outer wall surface and a slip joint in the inner wall surface, the bellows having a first end that transitions into the outer wall surface and transitions into the first section of the inner wall surface, and a second end that transitions into the outer wall surface and transitions into the second section of the inner wall surface, the slip joint defined by the overlap of the first section and the second section of the inner wall surface, the overlap of the first section and the second section defined in the bellows between the first end and the second end of the bellows, the overlap of the first section over the second section defines a backward-facing step portion in an interior of the tubular member that is opposite a flow direction inside the one-piece compliant heat exchanger tube, the backward-facing step portion creates flow turbulence within the interior of the tubular member, the bellows surrounds the slip joint and prevents leakage from the integrally-formed compliant heat exchanger tube.

8. The integrally-formed compliant heat exchanger tube of claim 7, wherein the bellows comprises a plurality of convolutes extending radially outwardly from a portion of the tubular member and circumscribing the tubular member, the plurality of convolutes being spaced from one another in the axial direction of the integrally-formed compliant heat exchanger tube, the bellows being compressible and expandable to accommodate thermal expansion and contraction of the integrally-formed compliant heat exchanger tube.

9. The integrally-formed compliant heat exchanger tube of claim 7, wherein the tubular member comprises a relatively straight tubular member, the plurality of integral heat transfer fins arranged in a parallel relationship in a first fin group and a second fin group with the integral bellows portion defined between the first fin group and the second fin group.

10. A heat exchange system comprising:
a unitary heat exchanger including a heat exchanger first flow passage and a heat exchanger second flow passage, the heat exchanger first flow passage configured to receive a first fluid and the heat exchanger second flow passage configured to receive a second fluid, the unitary heat exchanger being configured to transfer heat between the first and second fluids;

the heat exchanger first flow passage comprises an inlet plenum defining a plurality of tube inlets and an inlet port that receives the first fluid and each of the plurality of tube inlets is countersunk relative to a surface of the inlet plenum, an outlet plenum that discharges the received first fluid and defines a flow direction for the first fluid from the inlet plenum to the outlet plenum, and a plurality of one-piece compliant heat exchanger tubes extending between and integral with the inlet and outlet plenums to form a one-piece heat exchanger, each one-piece compliant heat exchanger tube comprising:

a tubular member having a proximal tube end, a distal tube end and comprising a tubular wall that extends from the proximal tube end to the distal tube end, the tubular wall having an outer wall surface and an inner wall surface, the inner wall surface having a first section that extends from the proximal tube end toward the distal tube end and a second section that extends from the distal tube end toward the proximal tube end, and the first section overlaps the second section;

a plurality of integral heat transfer fins extending radially outwardly from at least one portion of the tubular member and formed in the outer wall surface; and an integral bellows portion formed in the outer wall surface of the tubular wall, the integral bellows portion defined between the proximal tube end and the distal tube end such that the integral bellows portion is spaced apart from the proximal tube end and the distal tube end, the bellows portion and the plurality of heat transfer fins formed in the tubular member to form a one-piece heat exchanger tube, the integral bellows portion comprising a bellows defined in the outer wall surface and a slip joint in the inner wall surface, the bellows having a first end that transitions into the outer wall surface and transitions into the first section of the inner wall surface, and a second end that transitions into the outer wall surface and transitions into the second section of the inner wall surface, the slip joint defined by the overlap of the first section and the second section of the inner wall surface, the overlap of the first section and the second section defined in the bellows between the first end and the second end of the bellows, the overlap of the first section over the second section defines a backward-facing step portion in an interior of the tubular member that is opposite the flow direction of the first fluid inside the one-piece compliant heat exchanger tube and the backward-facing step portion creates flow turbulence within the interior of the tubular member.

11. The heat exchange system of claim 10, wherein the bellows comprises a plurality of convolutes extending radially outwardly from the portion of the tubular member and circumscribing the tubular member, the plurality of convolutes being spaced from one another in the axial direction of the one-piece compliant heat exchanger tube, the bellows being compressible and expandable to accommodate thermal expansion and contraction of the one-piece compliant heat exchanger tube, and the bellows surrounds the slip joint and prevents leakage from the one-piece compliant heat exchanger tube.

12. The heat exchange system of claim 10, wherein the unitary heat exchanger is disposed within an inner fan duct of a gas turbine engine, the first fluid comprising engine air received from within an engine case of the gas turbine engine and the second fluid comprising fan air received from a bypass flow passage of the gas turbine engine.

* * * * *